United States Patent
Kawamae et al.

(10) Patent No.: US 11,367,309 B2
(45) Date of Patent: Jun. 21, 2022

(54) IMAGING APPARATUS AND IMAGING SYSTEM

(71) Applicant: MAXELL, LTD., Kyoto (JP)

(72) Inventors: Osamu Kawamae, Kyoto (JP); Chiyo Ohno, Tokyo (JP); Hiroyasu Otsubo, Kyoto (JP); Osamu Ishizaki, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/306,863

(22) PCT Filed: Jun. 3, 2016

(86) PCT No.: PCT/JP2016/066612
§ 371 (c)(1),
(2) Date: Dec. 3, 2018

(87) PCT Pub. No.: WO2017/208437
PCT Pub. Date: Dec. 7, 2017

(65) Prior Publication Data
US 2019/0163964 A1     May 30, 2019

(51) Int. Cl.
*G06V 40/16* (2022.01)
*G06V 10/143* (2022.01)
(Continued)

(52) U.S. Cl.
CPC .......... *G06V 40/172* (2022.01); *G06V 10/143* (2022.01); *G06V 20/00* (2022.01);
(Continued)

(58) Field of Classification Search
CPC .......... G06K 9/00288; G06K 9/00228; G06K 9/00624; G06K 9/2018; H04N 5/33
See application file for complete search history.

(56) References Cited

U.S. PATENT DOCUMENTS

| 2004/0101162 A1* | 5/2004 | Higaki | G06T 7/215 382/103 |
| 2006/0102843 A1* | 5/2006 | Bazakos | G06K 9/00255 250/339.05 |

(Continued)

FOREIGN PATENT DOCUMENTS

| CN | 1581231 A | 2/2005 |
| CN | 103477186 A | 12/2013 |

(Continued)

OTHER PUBLICATIONS

Miyahara et al., "Face Detection System Using Multiband Camera", IPSJ SIG Technical Report, Information Processing Society of Japan, vol. 2013-EIP-60, No. 10, May 9, 2013 (May 9, 2013), pp. 1-6 with English Translation.

(Continued)

*Primary Examiner* — Zhitong Chen
(74) *Attorney, Agent, or Firm* — McDermott Will & Emery LLP

(57) ABSTRACT

Provided is an imaging system capable of stereo-photographing with both of visible and infrared images, and improving color reproducibility in visible-light-photographing. The imaging system includes two imaging sensors 1, and two DBPFs 5 that have transmittance characteristics in a visible light band and a second wavelength band, are respectively provided correspondingly to the two imaging sensors, and serve as optical filters. The imaging system has: at least four kinds of filters, which have mutual different spectral transmission characteristics corresponding to wavelengths in the visible light band and whose transmissions in a second wavelength band approximate each other; and two color filters provided so as respectively correspond to the two imaging sensors. The imaging system measures a dis- (Continued)

tance to a target based on two visible or infrared image signals.

6 Claims, 22 Drawing Sheets

(51) Int. Cl.
*G06V 20/00* (2022.01)
*H04N 5/33* (2006.01)
*H04N 9/04* (2006.01)

(52) U.S. Cl.
CPC ............. *G06V 40/161* (2022.01); *H04N 5/33* (2013.01); *H04N 9/04553* (2018.08); *H04N 9/04559* (2018.08)

(56) References Cited

U.S. PATENT DOCUMENTS

| | | | | |
|---|---|---|---|---|
| 2012/0218435 | A1* | 8/2012 | Olsen | H04N 5/3532 348/222.1 |
| 2014/0028804 | A1 | 1/2014 | Usuda et al. | |
| 2016/0300410 | A1* | 10/2016 | Jones | G06K 9/00348 |
| 2017/0134704 | A1 | 5/2017 | Otsubo et al. | |
| 2018/0157922 | A1* | 6/2018 | Miyamoto | G06K 9/00255 |

FOREIGN PATENT DOCUMENTS

| | | |
|---|---|---|
| JP | S62-107386 A | 5/1987 |
| JP | H03-081878 A | 4/1991 |
| JP | 5009395 B2 | 8/2012 |
| JP | 2015-050494 A | 3/2015 |
| JP | 2015-186155 A | 10/2015 |
| JP | 2016-102697 A | 6/2016 |
| JP | 2016-103786 A | 6/2016 |
| WO | 2015/199163 A1 | 12/2015 |
| WO | 2016/084926 A | 6/2016 |

OTHER PUBLICATIONS

Kazua Miyahara et al., IPSJ SIG Notes Electronic Intellectual Property (EIP) 2013-EIP-60, Information Processing Society of Japan, May 9, 2013 (May 9, 2013), pp. 1-6.

International Search Report for International Application No. PCT/JP2016/066612 dated Aug. 9, 2016 (with English translation).

Chinese Office Action issued in corresponding Chinese Patent Application No. 201680086253.2, dated Apr. 16, 2020, with English translation.

Machine English translation of Japanese Patent Application Laid-Open Publication No. 2015-050494 (Japanese Patent Application No. 2016-561955).

Machine English translation of WO2016/084926A (Japanese Patent Application No. 2016-561955).

Notice of Reasons for Refusal issued in Japanese Patent Application No. 2020-117477, dated Jul. 6, 2021 w/Machine English Translation.

Notice of Reasons for Refusal issued in corresponding JP Application No. 2020-117477, dated Mar. 16, 2022 w/Machine English Translation.

\* cited by examiner

| R | IR |
|---|---|
| G | B |

FIG. 7

CLASSIFICATION OF OUTPUT IMAGE ~701
    1) VISIBLE IMAGE
    2) INFRARED IMAGE

OUTPUT MODE ~702
    1) ONLY VISIBLE IMAGE
    2) ONLY INFRARED IMAGE
    3) AUTOMATIC SWITCHING
    4) SIMULTANEOUS OUTPUT OF BOTH IMAGES

ACCESS DESTINATION INFORMATION ON VISIBLE IMAGE ~703
    URL: /CAM_1/OUTPUT1/STREAM/

ACCESS DESTINATION INFORMATION ON INFRARED IMAGE ~704
    URL: /CAM_1/OUTPUT2/STREAM/

INFORMATION ON VISIBLE IMAGE ~705
    COMPRESSED METHOD: H.264
    COMPRESSED MODE: VBR
    TRANSFER RATE: 30fps
    RESOLUTION: 1280×1024
    GOP STRUCTURE:
    GPO SIZE: 15
    TRANSFER METHOD: RTP (Port NO: 123)

INFORMATION ON INFRARED IMAGE ~706
    COMPRESSED METHOD: H.264
    COMPRESSED MODE: VBR
    TRANSFER RATE: 15fps
    RESOLUTION: 1280×1024
    GOP STRUCTURE:
    GPO SIZE: 7
    TRANSFER METHOD: RTP (Port NO: 456)

*FIG. 9*

CLASSIFICATION OF ANALYZED METADATA ~901
    1) POSITIONAL INFORMATION OF MOVING-OBJECT REGION
    2) POSITIONAL INFORMATION OF FACE AREA

OUTPUT MODE OF ANALYZED METADATA ~902
    1) ONLY POSITIONAL INFORMATION OF MOVING-OBJECT REGION
    2) ONLY POSITIONAL INFORMATION OF FACE AREA
    3) SIMULTANEOUS OUTPUT OF BOTH 1) & 2) INFORMATION

ACCESS DESTINATION INFORMATION OF MOVING-OBJECT-REGION METADATA ~903
    URL: /CAM_1/OUTPUT3/METADATA/

ACCESS DESTINATION INFORMATION OF FACE-AREA METADATA ~904
    URL: /CAM_1/OUTPUT4/METADATA/

ACCESS DESTINATION INFORMATION OF MOVING-OBJECT-REGION ~905
/ FACE-AREA METADATA
    URL: /CAM_1/OUTPUT5/METADATA/

INFORMATION ON MOVING-OBJECT-REGION METADATA ~906
    DESCRIPTION: XML
    MAXIMUM NUMBER OF MOVING-OBJECT EXTRACTION REGION: 10
    FRAME INTERVAL: 10
    TRANSFER METHOD: HTTP (Port NO.: 800)

INFORMATION ON FACE-AREA METADATA ~907
    DESCRIPTION: XML
    MAXIMUM NUMBER OF MOVING-OBJECT EXTRACTION REGION: 7
    FRAME INTERVAL: 10
    TRANSFER METHOD: HTTP (Port NO.: 800)

FIG. 11
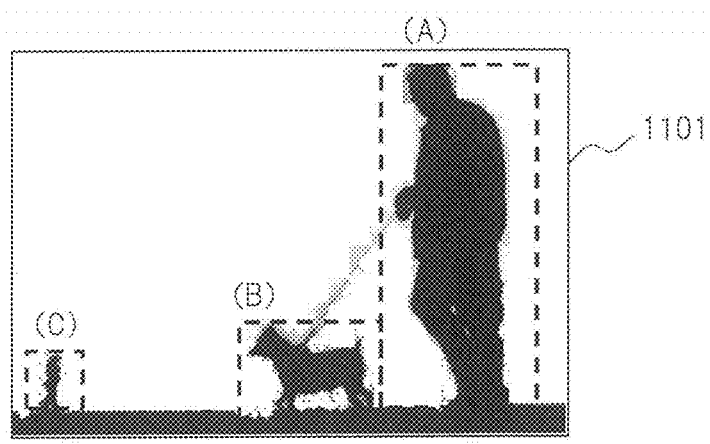
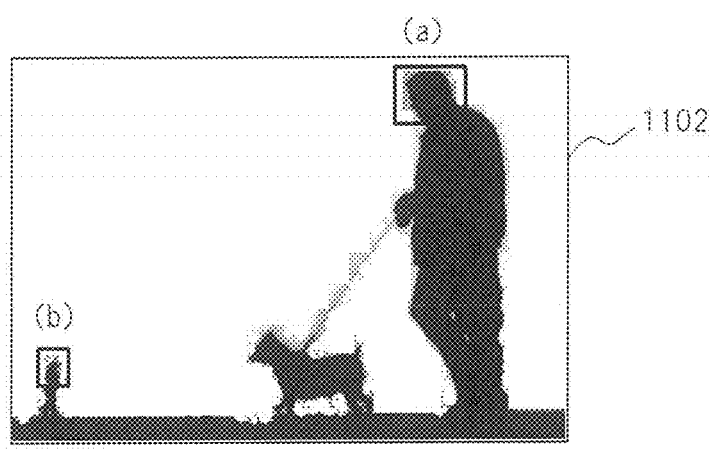

FIG. 17

CLASSIFICATION OF OUTPUT IMAGE ~1701
    1) VISIBLE IMAGE
    2) INFRARED IMAGE
    3) DISTANCE IMAGE

OUTPUT MODE ~1702
    1) ONLY VISIBLE IMAGE
    2) ONLY INFRARED IMAGE
    3) ONLY DISTANCE IMAGE
    4) AUTOMATIC SWITCHING OF VISIBLE & INFRARED IMAGES
    5) SIMULTANEOUS OUTPUT OF VISIBLE & INFRARED IMAGES
    6) 4) + DISTANCE IMAGE
    7) 5) + DISTANCE IMAGE

ACCESS DESTINATION INFORMATION ON VISIBLE IMAGE ~1703
  URL: /CAM_1/OUTPUT1/STREAM/

ACCESS DESTINATION INFORMATION ON INFRARED IMAGE ~1704
  URL: /CAM_1/OUTPUT2/STREAM/

ACCESS DESTINATION INFORMATION ON DISTANCE IMAGE ~1705
  URL: /CAM_1/OUTPUT3/STREAM/

INFORMATION ON VISIBLE IMAGE ~1706
  COMPRESSED METHOD: H.264
  COMPRESSED MODE: VBR
  TRANSFER RATE: 30fps
  RESOLUTION: 1280 × 1024
  GOP STRUCTURE:
  GOP SIZE: 15
  TRANSFER METHOD: RTP (Port NO.:123)

INFORMATION ON INFRARED IMAGE ~1707
  COMPRESSED METHOD: H.264
  COMPRESSED MODE: VBR
  TRANSFER RATE: 15fps
  RESOLUTION: 1280 × 1024
  GOP STRUCTURE:
  GOP SIZE: 7
  TRANSFER METHOD: RTP (Port NO.:456)

INFORMATION OF DISTANCE IMAGE ~1708
  COMPRESSED METHOD: PNG
  COMPRESSED MODE: —
  TRANSFER RATE: 15fps
  RESOLUTION: 1280 × 1024
  DISTANCE MODE: 15m
  DISTANCE ACCURACY: 5mm
  TRANSFER METHOD: RTP (Port NO.:456)

*FIG. 18*

CLASSIFICATION OF METADATA ~1801
    1) POSITIONAL INFORMATION ON MOVING-OBJECT REGION
    2) POSITIONAL INFORMATION ON FACE AREA
    3) 1) + DISTANCE INFORMATION
    4) 2) + DISTANCE INFORMATION

OUTPUT MODE OF ANALYZED METADATA ~1802
    1) ONLY POSITIONAL INFORMATION OF MOVING-OBJECT REGION
    2) ONLY POSITIONAL INFORMATION OF FACE AREA
    3) SIMULTANEOUS OUTPUT OF BOTH 1) & 2) INFORMATION
    4) 1) + DISTANCE INFORMATION
    5) 2) + DISTANCE INFORMATION
    6) 3) + DISTANCE INFORMATION

ACCESS DESTINATION INFORMATION OF MOVING-OBJECT-REGION METADATA ~903
    URL: /CAM_1/OUTPUT3/METADATA/

ACCESS DESTINATION INFORMATION OF FACE-AREA METADATA ~904
    URL: /CAM_1/OUTPUT4/METADATA/

ACCESS DESTINATION INFORMATION OF MOVING-OBJECT-REGION ~905
/ FACE-AREA METADATA
    URL: /CAM_1/OUTPUT5/METADATA/

INFORMATION ON MOVING-OBJECT-REGION METADATA ~906
    DESCRIPTION: XML
    MAXIMUM NUMBER OF MOVING-OBJECT EXTRACTION REGION: 10
    FRAME INTERVAL: 10
    TRANSFER METHOD: HTTP (Port NO.: 800)

INFORMATION ON FACE-AREA METADATA ~907
    DESCRIPTION: XML
    MAXIMUM NUMBER OF MOVING-OBJECT EXTRACTION REGION: 7
    FRAME INTERVAL: 10
    TRANSFER METHOD: HTTP (Port NO.: 800)

FIG. 21
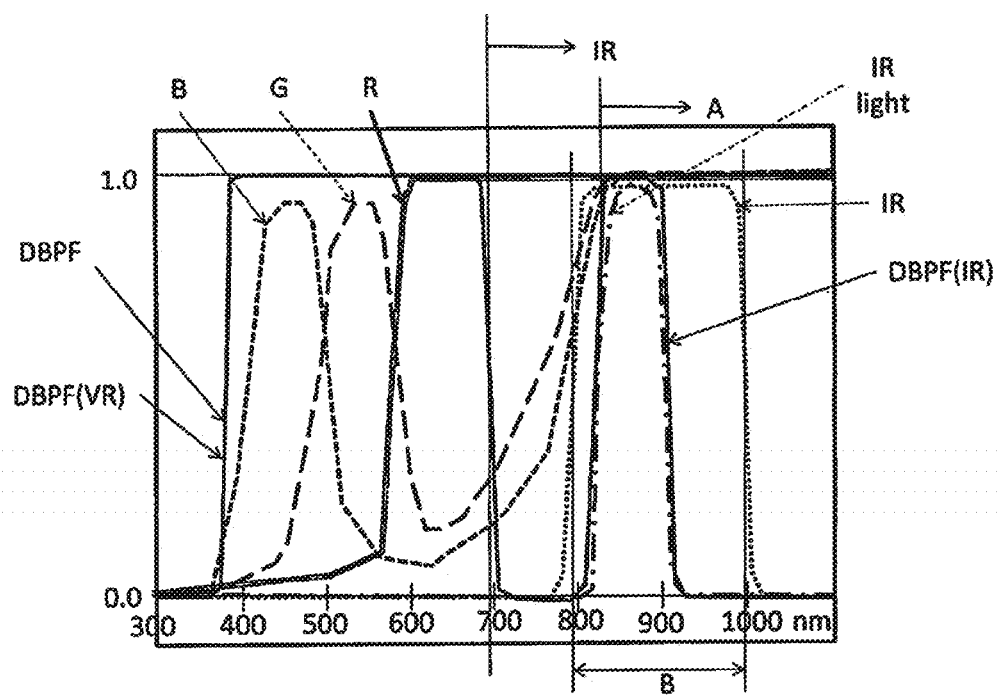
(A)
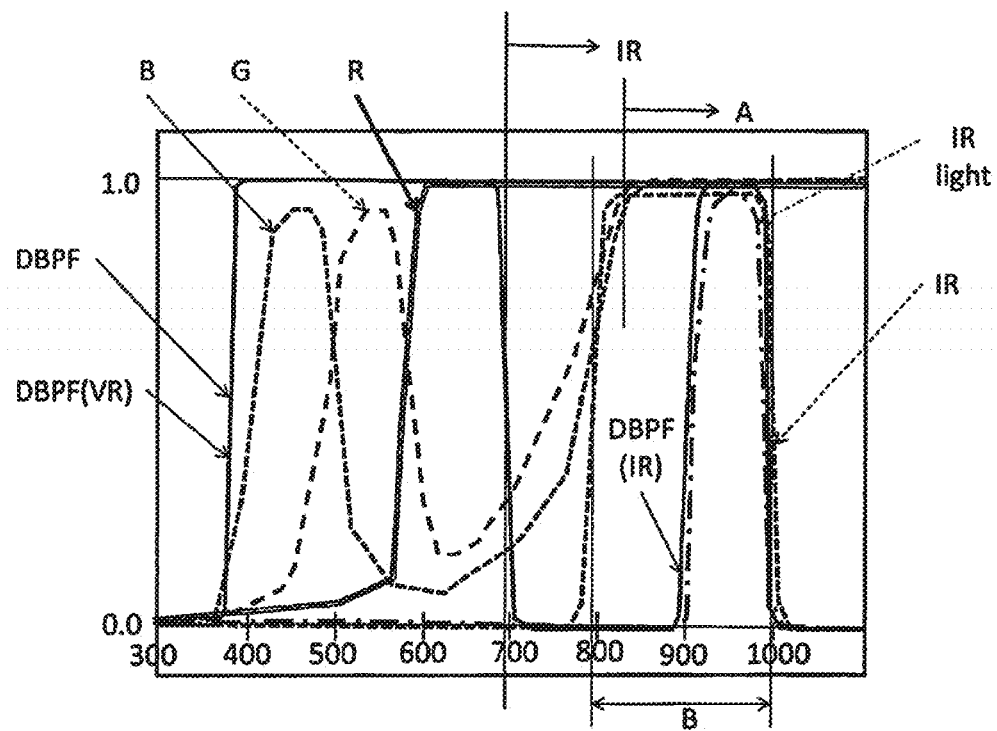
(B)

IMAGING APPARATUS AND IMAGING SYSTEM

CROSS REFERENCE

This application is the U.S. National Phase under 35 U.S.C. § 371 of International Application No. PCT/JP2016/066612 filed on Jun. 3, 2016, the entire contents of each are hereby incorporated by reference.

TECHNICAL FIELD

The present invention relates to an imaging apparatus and an imaging system.

BACKGROUND ART

A combination of image recognition technology and biometric authentication has been recently used to advance development of: surveillance cameras for detecting criminals, shoplifters, and terrorists, etc. by face authentication; and in-vehicle cameras utilized for automatic driving of automobiles.

For example, known has been a system in which a surveillance camera detects a distance by using a stereo camera and detects intrusion of suspicious individuals (see Patent Document 1). Patent Document 1 discloses a "distance-measurement image recognition apparatus using a stereo image(s)" as a method of measuring a shape and distance of an object. Known has been a technique called a stereo method for obtaining a distance(s) from a stereo image(s). In this stereo method, first, two right and left images called stereo images are inputted, and corresponding points of the right and left images (where a target object at a certain position of the left image is projected in the right image) are obtained by calculating a feature amount of the images. Details of how to obtain the corresponding points are described as an "image matching method" in, for example, Patent Document 2. Obtaining the corresponding points of the right and left images then makes it possible to calculate a distance to an object surface by the triangulation's principle, so that the distance to the object and the shape of the object surface can be known.

Patent Document 1 also proposes a moving-object recognition apparatus that can detect a moving object(s) with high accuracy and high speed and measure its shape and distance by using a known correspondence relationship with a stereo image(s).

Surveillance cameras and automatic driving cameras are required so as to photograph regardless of location and time such as outdoor and indoor locations, and day and night. However, no sufficient illumination may be often obtained depending on such a situation in photographing. In this case, it is conceivable to take an infrared photography by using infrared illumination which human beings cannot see. It is conceivable to take an infrared photography by using infrared light as illumination for illuminating a distant place in consideration of an influence of headlight on an oncoming vehicle(s) at night also in the automatic driving camera. In any case, it is conceivable to take a visible-light photography, without illumination, in the daytime which there is a high possibility of making an amount of visible light sufficient, and to take the infrared photography by using the infrared illumination, which it is difficult for human eyes to catch, in needing night illumination.

Considering such situations, it is preferable that each of the surveillance camera and the automatic driving camera can simultaneously photograph with the visible light and infrared light.

An imaging apparatus such as a surveillance camera continuously photographing day and night detects infrared light and photographs at nighttime. A photodiode (light receiving element) serving as a light receiving portion of an imaging sensor such as a CCD sensor or CMOS sensor can receive light up to a near infrared wavelength band of about 1300 nm, so that the imaging apparatus using those imaging sensors makes it possible in principle to photograph up to an infrared band.

Incidentally, a wavelength band of light with high human's visibility is 400 nm to 700 nm, so that when the imaging sensor detects near-infrared light, the human eyes appear reddish on an image(s) detected by the sensor. This makes it desirable to provide, in front of the imaging sensor, an infrared cut filter for blocking light in the infrared band and to remove light having a wavelength of 700 nm or more in order to match sensitivity of the imaging sensor with the visibility of the human beings in photographing in the daytime or at an indoor bright place(s). Meanwhile, providing no infrared cut filter is required in photographing at night or in a dark place.

Conventionally known as the above-mentioned imaging apparatus have been: an imaging apparatus that an infrared cut filter is manually attached to or detached from; or an imaging apparatus that an infrared cut filter is automatically inserted into and removed from. Furthermore, disclosed is an imaging apparatus not requiring the insertion and removal of the above-described infrared cut filter. For example, proposed is an optical filter having; a transmission characteristic in a visible light band; a cutoff characteristic in a first wavelength band adjacent to a long wavelength side of the visible light band; and a transmission characteristic in a second wavelength band which is a part of the first wavelength band (see Patent Document 3). This filter makes it possible to transmit light in both of the visible light band and a second wavelength band which is away from the visible light band on a long wavelength side, i.e., an infrared side of the visible light band.

Hereinafter, called a DBPF (double band pass filter) will be the optical filter that transmits, as mentioned above, light in the visible light band and light in the second wavelength band on the infrared side and blocks light in the other wavelength band.

Additionally, recently advanced as biometrics authentication has development of various authentication technologies such as fingerprints, faces, irises, veins, signatures, voiceprints, and walking. However, recited as biometrics authentication used with image recognition technologies about the images captured by the above-described surveillance camera and automatic driving camera are face authentication and iris authentication.

RELATED ART DOCUMENTS

Patent Documents

Patent Document 1: Japanese Patent Application laid-open No. H3-81878
Patent Document 2: Japanese Patent Application laid-open No. S62-107386
Patent Document 3: Japanese Patent No. 5009395

SUMMARY OF THE INVENTION

Problems to be Solved by the Invention

The DBPF of Patent Document 3 does not block, all the time, the light in the second wavelength band (a comparatively narrow wavelength band included in the infrared wavelength band) included in the infrared (near infrared) wavelength band, and causes the light to be transmitted. That is, unlike a case of using the infrared cut filter that cuts the long wavelength side of the visible light band, the photography in the visible light band is subjected to no little influence of infrared light transmitting the second wavelength band.

For the photography in the visible light band, a color filter is used in the imaging sensor that takes a color photography. Color filters, which correspond to respective pixels of the imaging sensor and in which respective color regions (filter portions) of red, green, and blue are arranged in a predetermined pattern, basically have a peak of transmittance of light in each color wavelength band and block transmission of light in the other color wavelength bands.

However, the long wavelength side of the visible light band has a different light transmittance depending on each color region and wavelength, but basically leads to transmitting of light. Therefore, if transmitted in the second wavelength band on the infrared side like the above-described DBPF, the infrared light passes through the color filter and reaches the photodiode (light receiving element) of the imaging sensor, thereby bringing an increase in an amount of electrons generated by the photoelectric effect due to the photodiode.

Further, in performing both of color photography with visible light and photography with infrared light illumination, for example, the color filter in which the respective color regions of red, green, and blue are arranged in the predetermined pattern(s) is provided with an infrared light region (infrared region) that has a peak of the light transmittance in the above-mentioned second wavelength band. That is, an arrangement (pattern) of the color filters is composed of four regions of red R, green G, blue B, and infrared IR. In this case, the infrared light region blocks the light in the visible light band and mainly transmits the light in the second wavelength band. Therefore, it is conceivable that an infrared light component(s) is removed from an image signal of each color of red, green, and blue by using an image signal of infrared light outputted from the imaging sensor which receives light passing through the infrared light region of the color filter. However, even such a signal processing has made it difficult to reproduce almost the same color as that in having color-photographed through use of the infrared cut filter. When right and left signals are made stereo to calculate a distance, some deviation between right and left signal levels has brought a factor of generating an error(s) in parallax calculation.

Furthermore, when face authentication is used by utilizing a photographed image(s) of a camera, there are roughly two types of face authentication; a type in which a user adjusts a user's face on a predetermined camera in an entry/exit management system of an office or building, a boarding procedure at an airport, immigration/registration management, or the like; and a type of authenticating a unspecified large number of users that the user has unknowingly photographed by a plurality of cameras at locations such as public facilities, airports, or transportation facilities for the purpose of pursuit of criminals, prevention of terror, and early detection of suspicious individuals, etc. The former type can recognize the face authentication with high precision even by recent technologies since photographing conditions are limited. Meanwhile, the latter type greatly influences a recognition rate since photographing conditions such as illumination condition, face direction, and angles greatly vary due to an environmental change(s).

In order to perform suspicious-individual detection by using surveillance cameras, use of both visible light and infrared light makes it possible to continuously photograph for 24 hours without depending on a photographing location(s) and a photographing time. Further, if the photographed image can be made as clearly as possible with less noise and higher resolution, the ability to early detect a suspicious individual(s) and to analyze a situation(s) at a time of crime is expected to be significantly improved.

Additionally, when the photography with infrared light and the photography with visible light as described above are used in combination, even the automatic driving camera that has a configuration of measuring a distance through a stereo method by using the two cameras obtains a clear image(s) with less noise, thereby being capable of achieving improvement of accuracy of the image recognition.

From the above, it is desirable that: simultaneous photography of both of an infrared image and a visible image is possible; a level of image quality such as noise, resolution, and color reproducibility is equal to or more than that of a visible image including no normal infrared image; and further stereo photography is possible with two camera configurations.

The present invention provides a technique capable of: photographing both of a visible image(s) and an infrared image(s) and capturing a high quality image(s) by improving color reproducibility at a time of photographing with visible light.

Means for Solving the Problems

An imaging apparatus or imaging system according to the present invention includes: an imaging element; a filter configured to have at least a characteristic of transmitting a visible light wavelength range and an infrared light wavelength range and to filter a signal from the imaging element based on the characteristic; a signal processor configured to process the signal filtered by the filter to output a visible light signal and an infrared light signal; a moving-object region extractor configured to generate, from the infrared signal outputted from the signal processor, information on a moving object in an image photographed by the imaging element; and a signal output controller configured to transmit, outside, a first data containing at least one of the visible and infrared light signals outputted from the signal processor, and a second data based on information on the moving object generated by the moving-object region extractor.

Further, an imaging apparatus or imaging system according to the present invention includes: two imaging elements; two filters configured to have at least a characteristic of transmitting a visible light wavelength region and an infrared wavelength region and to filter signals from the imaging elements based on the characteristic; two signal processors configured to process the signals filtered by the filters and to output a visible light signal and an infrared light signal; a distance calculator configured to use two visible image signals and/or two infrared image signals outputted from the signal processors to calculate a distance to a to-be-photographed subject that has been photographed with a visible image based on the visible image signals and/or an infrared image based on the infrared image signals; a moving-object region extractor configured to generate, from the infrared signals outputted from the signal processors, information on a moving object in an image photographed by the imaging elements; and a signal output controller configured to transmit, outside, a first data that contains at least one of the visible or infrared light signals outputted from the signal processors, a second data that is based on information on the moving object generated by the moving-object region extractor, and a third data that is based on a distance image generated by the distance calculator.

Effects of the Invention

The present invention makes it possible to obtain an image(s) with high quality. More specifically, for example, one aspect of the present invention makes it possible to simultaneously photograph both of high-quality infrared and visible images with a camera that is configured by one imaging sensor and one optical film, and so to improve visibility even under nighttime or an environmental change such as insufficient lighting. Further, another aspect of the present invention makes it possible to measure more accurately a distance of the object with both of the infrared and visible images, and to provide its information to an exterior system together with the visible or infrared image. Additionally, yet another aspect of the present invention makes it possible to extract a moving object in an image with higher speed by using not the visible image but the infrared image, and to provide its information to an exterior system together with the visible or infrared image.

BRIEF DESCRIPTIONS OF THE DRAWINGS

FIG. 7 is a diagram showing one configuration of various kinds of pieces of image information handled by the imaging system according to Embodiment 1 of the present invention;

FIG. 9 is a diagram showing one configuration of various kinds of pieces of analysis metadata information handled by the imaging system according to Embodiment 2 of the present invention;

FIG. 11 is a view showing an example of an image screen of an image handled by the imaging system according to Embodiment 2 of the present invention;

FIG. 17 is a diagram showing one configuration of various kinds of pieces of image information handled by the imaging system according to Embodiment 3 of the present invention;

FIG. 18 is a diagram showing one configuration of various kinds of pieces of image information handled by the imaging system according to Embodiment 3 of the present invention;

FIG. 21 is a graph showing transmittance spectra of a DBPF and a color filter of an imaging sensor in the imaging system according to Embodiment 3 of the present invention;

DETAILED DESCRIPTION OF PREFERRED EMBODIMENTS

Embodiment 1

Hereinafter, an embodiment of the present invention will be described with reference to the drawings.

Figure 1:
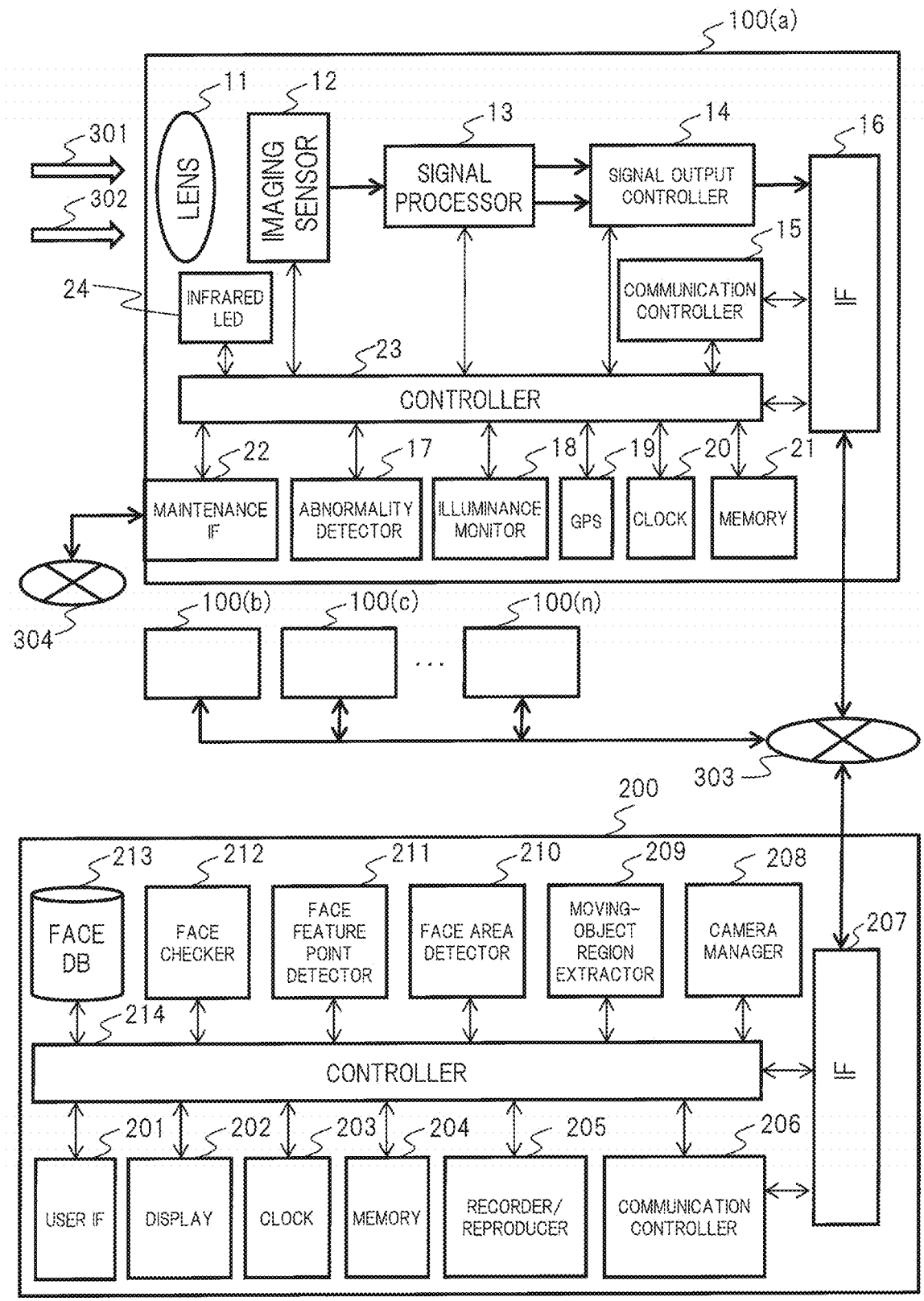
FIG. 1 is a schematic diagram showing an imaging system according to Embodiment 1 of the present invention.

FIG. 1 shows a configuration example of an imaging system according to Embodiment 1 of the present invention. The imaging system roughly includes one or more imaging apparatuses 100((a)-(n)), and one or more controller apparatuses 200. The imaging apparatuses 100 and the controller apparatuses 200 are connected via a network 303. Although the network 303 is described on the premise of a wired LAN (Local Area Network) in the present embodiment, it may be a general-purpose network such as a wireless LAN (WiFi), a USB (Universal Serial Bus), or IEEE 1394.

The network 303 uses a standard IP (Internet Protocol) as a network protocol, and uses a TCP (Transmission Control Protocol) or UDP (User Datagram Protocol) as a higher transport protocol. Used for transferring an image(s) photographed by the imaging apparatus 100 is a further higher application protocol, for example, a RTP (Real-time Transport Protocol)/RTCP (RTP Control Protocol), a HTTP (Hyper Text Transfer Protocol), or the like. Used for transfer control is a RTSP (Real-Time Streaming Protocol) or the like. Incidentally, either IPv4 or IPv6 may be used for the IP. Additionally, utilization of Web services using techniques such as HTTP and RTP as described above also makes it possible to communicate between higher applications. Although not shown, a hub or router may be also interposed for connection of the Internet.

The controller apparatus 200 can control the plurality of imaging apparatuses 100, and can also exchange information with the other controller apparatuses 200.

The imaging system of the present embodiment can be used for services or applications such as surveillance applications and entry/exit management.

The imaging apparatus 100, which has a feature of the present embodiment, includes a lens 11, an imaging sensor 12, a signal processor 13, a signal output controller 14, a communication controller 15, an IF (Interface) 16, an abnormality detector 17, an illuminance monitor 18, a GPS 19, a clock 20, a memory 21, a maintenance IF 22, a controller 23, and an infrared LED 24.

The lens 11 is a photography optical lens, which forms an image at a predetermined focal length on the imaging sensor 12 with visible light 301 and infrared light (invisible light) 302 from a subject to be photographed, and includes a plurality of lenses.

The image sensor 12 is a unit configured to spectrally separate, through various kinds of filters, the visible light and infrared light of the image formed by the lens 11, photoelectrically convert them, and output a plurality of pixel signals corresponding to predetermined wavelength components.

The signal processor 13 is a unit configured to: process an output signal(s) outputted from the image sensor 12; perform, to an image signal(s), an interior processing, an image processing for removing an influence of infrared light passing through the second wavelength band during the color photographing, and an image processing such as gamma correction, white balance, or RGB matrix correction; and output the output signals of the visible and infrared images.

A visual image signal and an infrared image signal, which are outputted from the signal output controller 14 and signal processor 13 and obtained by "photographing an object at the same timing", are transmitted via the IF 16 to the predetermined controller apparatus 200 connected to the network pursuant to an instruction(s) of the communication controller 15 or controller 23.

The communication controller 15 is a unit configured to control the image signal outputted from the signal output controller 14 via the IF 16, and transmit and receive a control signal to and from the controller apparatus 200 via the IF. It is also a unit configured to execute the above-mentioned network protocol, application protocol, and Web service, etc.

The IF 16 is a communication IF configured to connect the imaging apparatus 100 and the network 303.

The abnormality detector 17 is a unit configured to monitor constantly or regularly whether any abnormality has occurred in hardware and software of the imaging apparatus 100, and detect such abnormality. For example, the abnormality includes a case where the imaging apparatus 100 is removed from a predetermined installation place, a case where the photography of the image(s) is impossible, a case where network communication cannot be made, a case where unauthorized access is made, or the like.

The illuminance monitor 18 is a unit configured to monitor constantly or regularly brightness of a photographing range of the imaging apparatus 100 by using an illuminance sensor or the like. When detecting a shortage of illuminance, the illuminance monitor notifies the controller 23 of the illumination shortage and irradiates the infrared LED 24.

The GPS 19 is a unit configured to acquire a current position of the imaging apparatus 100 itself from position information received from a satellite. The acquired position information can be also notified to the controller apparatus 200 via the IF 16.

The clock 20 is a unit configured to execute current time information management, and timer setting and release. The time information is automatically adjusted by using a general-purpose technique such as a NTP (Network Time Protocol) or standard radio wave.

The memory 21 is a storage (ROM (Read-Only Memory) area, FROM (Flash ROM) area) configured to store programs, various kinds of pieces of setting information, and property information, and is a storage (RAM (Random Access Memory) area) configured to store work data. Here, a recorder may be used by a combination of an external memory (a USB memory or NAS (Network-Attached Storage)) and a portable medium (a microflash, an SD card, and a magnetic tape, etc.) besides an built-in memory.

The maintenance IF 22 is an IF with which a maintenance worker of the imaging apparatus 100 communicates in order to diagnose at times of a updating processing of the program(s) and occurrence of a failure(s). Further, when the abnormality detector 17 detects any abnormality, the maintenance IF can automatically notify a remote maintenance site of a content(s) of the abnormality detection.

The controller 23 is a unit configured to control, as a whole, operations of the respective compartments (constituent elements) described above.

Meanwhile, the controller apparatus 200 includes a user IF 201, a display 202, a clock 203, a memory 204, a recorder/reproducer 205, a communication controller 206, an IF 207, a camera manager 208, a moving-object region extractor 209, a face area detector 210, a face feature point detector 211, a face checker 212, a face DB 213, and a controller 214.

The user IF 201 is a unit configured to operate the controller apparatus 200 through user's use of a remote controller, a touch panel, a keyboard, a mouse, buttons, or the like.

The display 202 is a unit configured to display, on an external or built-in monitor, an operation screen of the controller apparatus 200, a visible or infrared image received via the network 303, a result of the face authentication, and a warning screen, etc.

The clock 203 is a unit configured to execute current time information management, and timer setting and removal. The time information is automatically adjusted by using a general-purpose technique such as a NTP or standard radio wave.

The memory 204 is a storage (ROM area, FROM area) for storing programs, various kinds of pieces of setting information, and property information, and a storage (RAM area) for loading these programs and data and storing them temporarily, and for storing work data. Here, a recorder may be used by a combination of an external memory (USB memory or NAS) or a portable medium (microflash, SD card, DVD, Blu-ray (registered trademark) Disc, and magnetic tape, etc.) besides a built-in memory.

The recorder/reproducer 205 is a unit configured to record and reproduce, in or from the memory 204, the visible and infrared images received via the network 303 and the IF 207, metadata attached to these images, and the like. Those to-be-recorded data are encrypted/decrypted and compressed/expanded as necessary.

The communication controller 206 is a unit configured to transmit and receives a control signal to and from the imaging apparatus 100 via the network 303 and the IF 207. The communication controller is also a unit configured to execute the above-mentioned network protocol, application protocol, and Web service, etc.

The IF 207 is a communication IF configured to connect the controller apparatus 200 and the network 303.

The camera manager 208 is a unit configured to manage one or more imaging apparatuses 100 managed by the controller apparatus 200 via the network 303. The camera manager is a unit configured to create, retain, update, and delete information (e.g., IP address, installation location, manufacturer name, model name, introduction time and operation time, function specification, and maintenance contact, etc.) relating to the imaging apparatus 100 to be managed.

The moving-object region extractor 209 is a unit configured to extract a moving object such as a human being, an animal, or an object present in the visible or infrared image received via the IF 207 or recorded by the recorder/reproducer 205, and acquire its position information. A method of extracting the moving bodies from the image includes: a method of creating a difference image (e.g., a difference image between first and second images, and a difference image between second and third images) from a plurality of continuous images (e.g., three) to extract the moving object by their comparison; a method of extracting the moving object by using a background difference method while a background image is generated instead of a photographing image; and the like.

The face area detector 210 detects a human-face existing region directly from the visible or infrared image received via the IF 207 or recorded by the recorder/reproducer 205, or from the moving-object region extracted by the moving-object region extractor 209. A method of detecting it includes a technique etc. of a high-speed face detection algorithm that uses an integral image(s) of Viola & Johns and a cascade type discriminator.

The face feature point detector 211 is a unit configured to detect feature points such as eyes, nose, and mouth ends in the face area detected by the face area detector 210. This makes it possible to make image position correction so as to accurately extract the face features.

The face checker 212 is a unit configured to select optimum features, for identifying individuals, from the feature points detected by the face feature point detector 211, and to perform matching by using the face DB 213. Here, utilized as a feature for distinguishing between faces can be: a method (e.g., a specific method applying principal component analysis) of using the entire grayscale (light and shade) information in the face area; a method of using, as an amount of characteristics, an interval of a local grayscale change and a directional component (e.g., Elastic Bunch Graph Matching); a method combining these methods; and the like. Applied as a matching method can a nearest neighbor method, and a linear discriminant analysis, etc.

In order to be matched by the face checker 212, the face DB 213 is a unit configured to store, in a built-in or external storage medium, data previously registering a face image(s). Images that artificially generate an illumination change, and a face direction change, etc. can also be registered from these registered images. For example, an entry/exit management system registers face images of users who are permitted to enter a specific area or users who are employees. The management system can also register additionally an image capable of being confirmed as the identical person as a result of the face authentication at a specific place. Here, this face DB 213 may be an external DB that can be accessed via the network 303 instead of the controller apparatus 200. For example, a surveillance camera system in an airport etc. utilizes a face DB of a suspect, a terrorist, or the like provided by a police or a legal agency. Additionally, the DB may be shared between the plural controller apparatuses.

The controller 214 is a unit configured to control, as a whole, behaviors of the respective components described above. Also, if the user is not a previously registered person (such as a suspicious person) or matches a suspect as a result of the matching by the face checker 212, the above controller automatically reproduces a report based on predetermined format, informs an administrator(s) or police of the report, and send it to its contact address.

Figure 2:
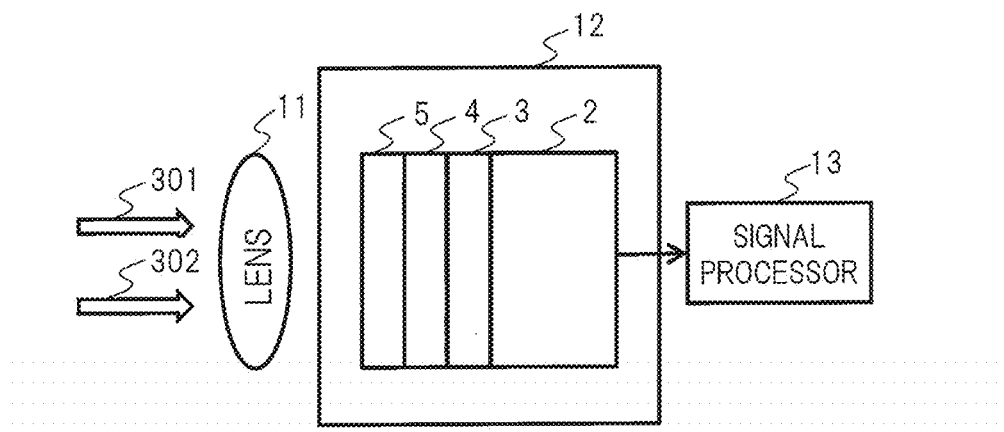
FIG. 2 is a schematic diagram showing a configuration of an imaging sensor of the imaging system according to Embodiment 1 of the present invention.

FIG. 2 shows a configuration example of the imaging sensor 12 in the camera 100.

The imaging sensor 12 includes a sensor body 2, a color filter 3, a cover glass 4, and a DBPF 5.

The sensor body 2 is a CCD (Charge Coupled Device) image sensor, and is a unit configured to place a photodiode as a light receiving element for each pixel. Instead of the CCD image sensor, a CMOS (Complementary Metal Oxide Semiconductor) image sensor may be used.

Figures 4, 5:
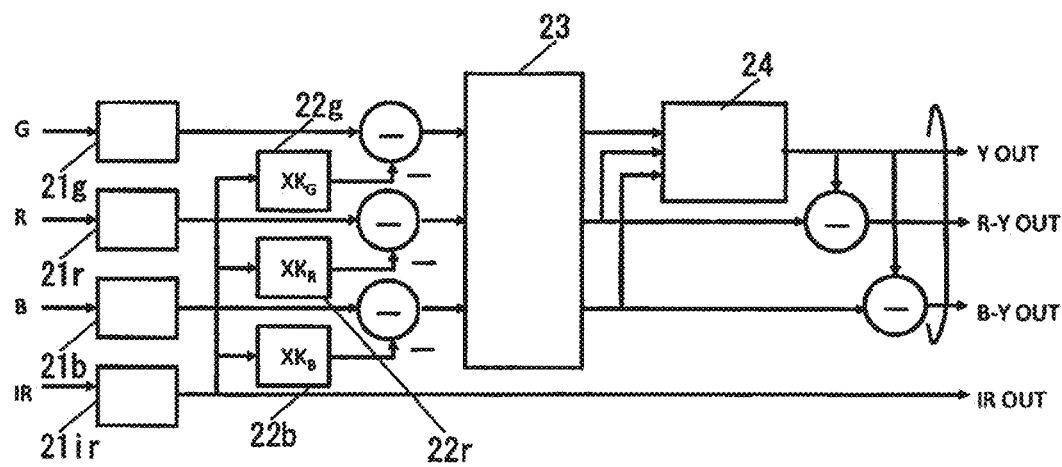
FIG. 4 is a schematic diagram showing one configuration example of the color filter of the imaging system according to Embodiment 1 of the present invention.
FIG. 5 is a block diagram for explaining a signal processor of the imaging system according to Embodiment 1 of the present invention.

The color filter 3 is provided to the sensor body 2, and is a unit configured to arrange, at a predetermined array, respective areas of red (R), green (G), blue (B), and infrared (IR) for each pixel. FIG. 4 shows variations of the color filter used in the present embodiment.

The cover glass 4 covers the sensor body 2 and the color filter 3, thereby protecting them.

The DBPF 5 is an optical filter formed on the cover glass 4. The DBPF 5 is an optical filter that has: a permeability characteristic in a visible light band; a cutoff characteristic in a first wavelength band adjacent on a long wavelength side of the visible light band; and a permeability characteristic in a second wavelength band serving as a part of first wavelength band. Incidentally, an arrangement position of the DBPF 5 is not limited thereto, and may be provided to, for example, the lens 11.

Figure 3:
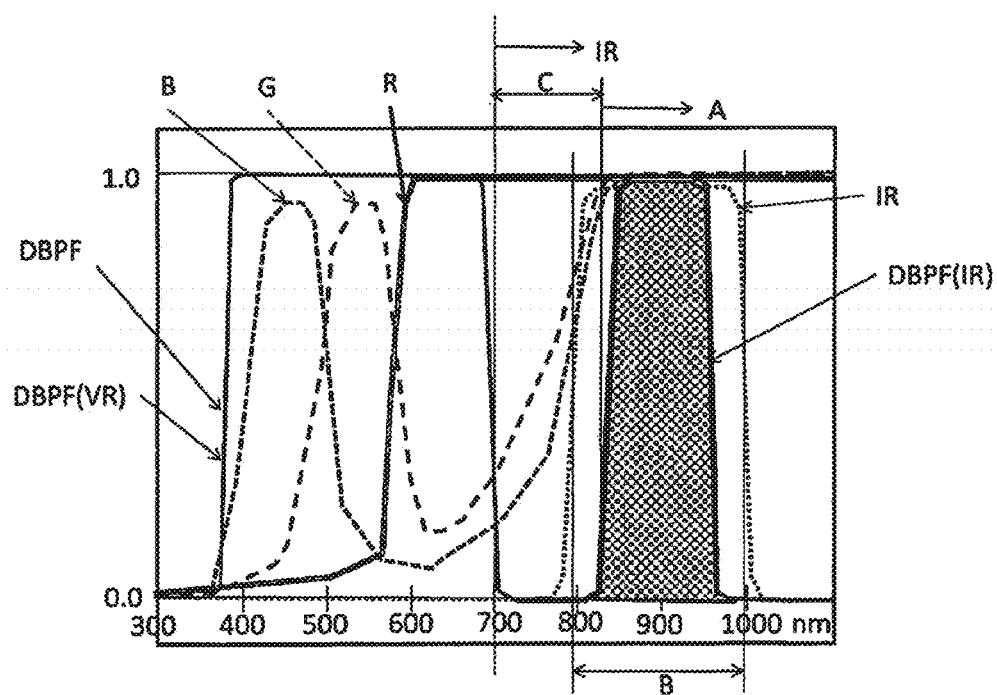
FIG. 3 is a graph showing transmittance spectra of a DBPF and a color filter of the imaging sensor in the imaging system according to Embodiment 1 of the present invention.

FIG. 3 shows transmittance spectra of R, G, B and IR filters of the color filter 3, where a longitudinal axis and a vertical axis represent transmittance and wavelength, respectively. A wavelength range in a graph includes parts of a visible light band and a near infrared band, and shows a wavelength range of, for example, 300 nm to 1100 nm.

As indicated by the symbol R (double line) of the graph, an R filter portion has the substantially maximum transmittance at a wavelength of 600 nm, and its long wavelength side becomes maintained in a state of having the substantially maximum transmittance even if the wavelength exceeds 1000 nm.

As indicated by the symbol G (dashed line with a wide interval) in the graph, a G filter portion has: a peak at which the transmittance becomes a local maximum near or at a wavelength of about 540 nm; and a portion at which the transmittance becomes a local minimum near or at a wavelength of about 620 nm on its long wavelength side. The G filter portion also has an upward tendency of the transmittance toward the long wavelength side from the portion of the local minimum of the transmittance, and the transmittance becomes the maximum near or at a wavelength of about 850 nm. Consequently, the transmittance on the long wavelength side remains the maximum even if the wavelength exceeds 1000 nm.

As indicated by the symbol B (broken line with a narrow interval) in the graph, a B filter portion has a peak at which the transmittance becomes a local maximum near or at a wavelength of about 460 nm, and its long wavelength side has a portion at which the transmittance becomes a local minimum near or at a wavelength of about 630 nm. Consequently, the long wavelength side has an upward tendency of the transmittance, and the transmittance becomes the maximum at a wavelength of about 860 nm. This leads to a state in which the transmittance on the long wavelength side remains the maximum even if the wavelength exceeds 1000 nm.

An IR filter portion blocks light on a short wavelength side from a wavelength of about 780 nm, blocks light on a long wavelength side from a wavelength of about 1020 nm, and has the maximum transmittance near or at a wavelength of about 820 nm to 920 nm.

The transmittance spectrum of each of the R, G, B and IR filter portions is not limited to that shown in FIG. 3 and the like. However, the color filter 3 generally used at present is expected to show a transmittance spectrum close to this. Incidentally, the reference numeral 1 on the vertical axis indicating the transmittance does not mean alight transmission of 100% and means, for example, the maximum transmittance of the color filter 3.

Here, as illustrated by the symbol DBPF (solid line) in the graph, the DBPF 5 used in the present embodiment has high transmittances in two band, one being a visible light band illuminated by the DBPF (VR), and the other being an infrared band (second wavelength band) illustrated by the DBPF (VR) which is at a position slightly distant from the long wavelength side with respect to the visible light band. Additionally, the DBPF (VR) as a high-transmittance band in the visible light band has a wavelength band of, for example, about 370 nm to 700 nm. The DBPF (IR) as a second wavelength band having a high transmittance in an infrared side has a band of a wavelength of, for example, about 830 nm to 970 nm.

The present embodiment defines a relationship between the transmittance spectrum of each filter portion of the above-described color filter 3 and a transmittance spectrum of the DBPF 5 as described below. That is, the DBPF (IR) serving as the second wavelength band and passing through the infrared light of the transmittance spectrum of the DBPF 5 has the substantially maximum transmittances at all of the R, G, and B filter portions so that the respective filter portions belong to (is included in) a wavelength band A shown in FIG. 2 and having almost the same transmittance and also belong to a wavelength band B which transmits light having the maximum transmittance of the IR filter portion.

Here, the wavelength band A in which the transmittances of the respective R, G, and B filter portions are the same is a portion having a transmittance of 10% or less about a transmittance difference between the respective filter portions. Incidentally, on a short wavelength side of this wavelength band A, the R filter portion has the substantially maximum transmittance while the G and B filter portions have the low transmittances. A portion having a transmittance difference between the respective R, G, and B filter portions in DBPF 5 corresponds to a portion serving as the minimal transmittance and nearly blocking light of the DBPF 5 between the DBPF (VR) serving as a portion having the high transmittance in the visible light band and the DBPF (IR) serving as a portion having the high transmittance in the second wavelength band of the infrared light band. That is, the infrared side cuts off the light transmission of a portion increasing the transmittance difference between the respective R, G, and B filter portions, and the long wavelength side separate from the above portion has the maximum transmittance of each of the filter portions so that light transmits the wavelength band A having the same transmittance.

From the above, the present embodiment has an area(s) for transmitting light in not only the visible light band but also the second wavelength band on the infrared light side in the DBPF 5 used instead of the infrared light cut filter, and so leads to being subjected to an influence of the light passing through the second wavelength band in color-photographing by the visible light. However, as described above, a wavelength band in the second wavelength band does not transmit light, the respective R, G, and B filter portions in the wavelength band being different in transmittance, while only another wavelength band therein transmits light, the respective filter portions in the another wavelength band having the maximum transmittances and their transmittances being the same.

Further, a wavelength band in the second wavelength band of the DBPF 5 transmits light, the IR filter portion in the above wavelength band having the maximum transmittance. Therefore, if it is assumed that four pixels, which are very close to each other and to which the same light is irradiated, are each provided with the R, G, B, and IR filter portions, the R, G, B, and IR filter portions in the second wavelength band pass through light similarly to the above and the light, which has the same light amount in each filter portion including IR and serves as light on the infrared side, leads to reaching a photodiode of the imaging sensor body. That is, a light amount of light beams passing through the infrared-side second wavelength band among light beams passing through the respective R, G, and B filters becomes almost the same as a light amount of light beams passing through the IR filter portion. For the above-mentioned assumption, a difference between each output signal of the above-assumed pixels from the sensor body 2 having received the light transmitting each of the R, G, and B filters, and each output signal of the above-assumed pixels from the sensor body 2 having received the light passing through the IR filter is basically an output signal of each visible-light portion of the R, G, and B, the each visible-light portion cutting the infrared-side light passing through each of the R, G, and B filter portions.

Since the color filter 3 actually arranges any one of the R, G, B, and IR filter portions in each pixel of the sensor body 2, there is a high possibility that light amounts of light beams of respective colors irradiated to each pixel will be different. For this reason, for example, a well-known interpolation method is used per pixel to obtain luminance of the color of each pixel, and a difference between each of the interpolated R, G, and B luminances of the pixels and the interpolated IR luminance similarly can be made luminance of each of the R, G, and B. Incidentally, an image processing method of excluding an infrared light component(s) from each color of the R, G, and B luminances is not limited thereto, and may use any method as long as being a method capable of finally cutting an influence of light passing through the second wavelength band from each color of the R, G, and B luminances. Even in any method, the DBPF 5 cuts a portion other than a portion having a 10% transmittance of each of the R, G, and B filter portions on an infrared side, i.e., a portion other than a portion having a predetermined ratio of the transmittance, and so a processing for removing the influence of the infrared light becomes easy in each pixel.

As described above, use of the above image sensor 12 makes it possible to realize the imaging apparatus 100 capable of both of color photography and infrared-light photography. It is generally conceivable to color-photograph at normal photography and to infrared-photograph by using infrared-light illumination, which is difficult for human beings to recognize, without using visible-light illumination at night. In various kinds of surveillance cameras etc., for example, it is conceivable to night-photograph by infrared light utilizing infrared-light illuminance when the night photography is performed without requiring night illumination or at a place(s) desiring no night illumination. Further, this makes it possible to utilize use applications to daytime photography and night photography etc. for observing wild animals.

When infrared-light photography is used as night-photography, a light amount(s) of infrared light lacks at night similarly to the visible light, and so the infrared-light illumination is needed.

Transmittance spectra (A) and (B) of the DBPF 5 shown in FIG. 21 are determined in view of transmittance spectra of the respective R, G, B and IR filter portions and an emission spectrum of light for infrared-light illumination, e.g., a LED of illumination infrared light.

FIG. 21 shows transmittance spectra R, G, B, and IR of the respective color filter portions similar to FIG. 2, and an emission spectrum IR-light of the LED illumination additionally to a transmittance spectrum DBPF of the DBPF 5.

Similarly to the DBPF shown in FIG. 2, the second wavelength band illuminated by DBPF (IR), which is a portion transmitting the infrared light of the DBPF shown in FIG. 21(A), has the substantially maximum transmittances at all of the R, G, and B filter portions so as to belong to the wavelength band A shown by FIG. 2 and having almost the same transmittance at each of the filter portions and belong to the wavelength band B in which IR filter portion having the maximum transmittance transmits light.

Additionally thereto, an almost entirety of a wavelength band, which belongs to both of the above-mentioned wavelength bands A and B and in which an emission spectrum of infrared-light illumination has a peak, is set to be included in the wavelength band of the DBPF (IR). Incidentally, when the infrared-light photography is taken not under night natural light but under infrared-light illumination, the second wavelength band indicated by the DBPF (IR) does not require being wider than a peak width of an optical spectrum of the infrared-light illumination, and when the spectrum of the infrared-light illumination is included in both of the above-mentioned wavelength bands A and B, a peak portion of the transmittance of the DBPF 5 indicated by the DBPF (IR) may be provided as a second wavelength band so as to have almost the same peak width as that of a peak whose apex has, for example, about 860 of the emission spectrum of the infrared-light illumination.

That is, in FIG. 21A, a peak of an emission spectrum of infrared-light illumination indicated by IR-light is on a short wavelength side of each of the above-mentioned wavelength bands A and B, and overlaps a peak of the DBPF indicated by DBPF (IR) 2 overlaps a peak of an emission spectrum of the IR-light on a short wavelength side of each of the wavelength bands A and B that include the second wavelength band of the DBPF indicated by the DBPF (IR).

Also in a graph shown in FIG. 21(B) similarly to FIG. 21(A), the emission spectrum of the infrared-light illumination is added to the graph of FIG. 2, and the second wavelength band indicated by the DBPF (IR) and having a portion in which an infrared side of a transmittance spectrum of the DBPF 5 has high transmittance is combined with the peak of the emission spectrum indicated by the IR-light of the above-mentioned infrared-light illumination.

In FIG. 21(B), illumination in which a peak of an emission spectrum is longer in wavelength than that of FIG. 21(A) is used as infrared-light illumination. This peak is included in the wavelength bands A and B and exists on a long wavelength side of each of the wavelength bands A and B. Correspondingly thereto, the second wavelength band indicated by the DBPF (IR) of the DBPF 5 is provided so as to overlap the peak indicated by the IR-light of the infrared illumination in each of the above-mentioned wavelength bands A and B.

The second wavelength band of the DBPF 5 may be any of the second wavelength bands shown in FIGS. 2 and 21, and the second wavelength band may have only to be included in both of the above-mentioned wavelength bands A and B. Additionally, when the wavelength band that becomes the peak of the emission spectrum of the infrared-light illumination used for nighttime infrared-light photography is determined, it is preferable that such a wavelength band is included in both of the above-mentioned wavelength bands A and B and the second wavelength band of the DBPF 5 is combined with the peak of the emission spectrum of the infrared-light illumination.

In such an imaging sensor, the second wavelength band transmitting light on the infrared side of the DBPF 5 has the maximum transmittance of each filter portion on each infrared side of the R, G, B, and IR filter portions, and is included in: the wavelength band A in which the transmittances of the respective filter portions are the same; and the wavelength band B in which the transmittance of the IR filter portion becomes the maximum. In other words, on the long wavelength side of the visible light band, only the R filter portion among the R, G, and B filter portions becomes the maximum about transmittance, but the G and B filter portions become no maximum about transmittance. Thus, light passing through a portion, in which the transmittances of the R, G, and B filter portions are not the same and are different, is cut by the DBPF 5.

That is, since each of the R, G, B and IR filter portions is set to transmit light in the second wavelength band on the infrared side, all the transmittances on the infrared sides of the respective filter portions become the same. If light beams with the same light amount are irradiated to the second wavelength band, light amounts of light beams transmitted to the R, G, B, and IR filter portions become the same. This makes it possible to correct colors based on a signal outputted from a pixel corresponding to each of the R, G, and B filter portions, and easily obtain an image(s) that suppresses an influence due to infrared light passing through the second wavelength band and having a color(s) in color-photographing.

Causing the second wavelength band to correspond to the peak of the emission spectrum of the infrared-light illumination included in the wavelength bands A and B brings efficient use of the light of the infrared-light illumination and makes it possible to narrow a width of the second wavelength band and reduce an influence of the infrared light passing through the second wavelength band in color-photographing.

FIG. 5 is a block diagram showing a signal processing of the above-mentioned signal processor 12.

Explained will be a processing outline with respect to the signal outputted from the imaging sensor 12 mounting the color filters shown in FIG. 4.

Output signals of respective R, G, B and IR pixels are sent to respective interior processing blocks 21*r*, 21*g*, 21*b*, and 21*ir*. Each of the interior processing blocks 21*r*, 21*g*, 21*b*, and 21*ir* uses an interpolation processing, which utilizes a well-known method, to convert R, G, B and IR signals so that image data of respective frames of the above-described color filter 3 are respectively made: image data 20r whose pixels are all represented by red R; image data 20g whose pixels are all represented by green G; image data 20b whose pixels are all represented by blue B; and image data 20ir whose pixels are all represented by infrared IR.

Next, in order to remove the influence of the infrared light received from the above-mentioned second wavelength band, infrared-light removal signal generation blocks 22r, 22g, 22b, and 22ir generate, from a signal of the IR, a signal for subtracting from each of the R, G, and B color signal. Subtracted from the respective R, G, and B color signals are the signals generated by the those infrared-light removal signal generation blocks 22r, 22g, 22b, and 22ir for each of the R, G, and B. In this case, the same pixel as described above makes a processing(s) easy since the signal of the IR has just to be basically removed from the respective R, G, and B signals. Since even the same pixels are actually different in sensitivity per pixel of each color due to a characteristic etc. of the filter portion of each pixel, a signal for subtracting from each of the R, G, and B signals for each of R, G, and B images is created from the IR signal.

Next, regarding each of the R, G, and B signals, the image processing block 23 performs: a well-known RGB matrix processing for correcting colors by using a determinant to covert each of the R, G, and B signals; a well-known white balance processing for making output values of the respective R, G, and B signals the same about a portion to be whited in the image; and a well-known gamma correction processing serving as correction for outputting an image(s) to a display etc. Then, a luminance matrix block 24 multiplies each of the R, G, B color signals by a coefficient to generate a signal of luminance Y. Further, subtraction of the signal of luminance Y from the blue B and red R signals makes it possible to calculate color difference signals R-Y and B-Y and output the Y, R-Y, and B-Y signals.

Additionally, the IR signal is basically outputted as an image(s) of black and white gradation.

Figure 6:
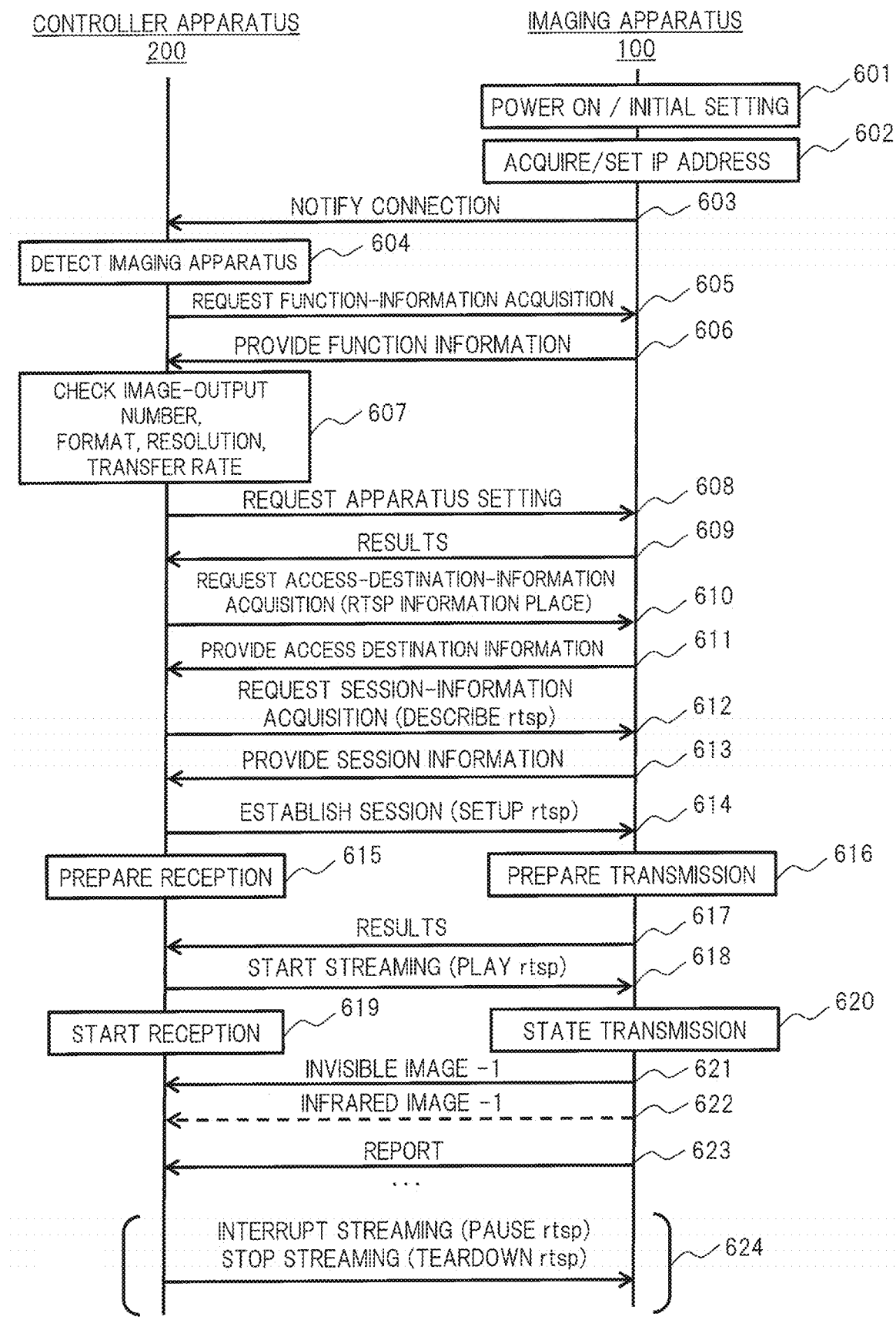
FIG. 6 is a flowchart for explaining a communication flow between a camera and a controller of the imaging system according to Embodiment 1 of the present invention.

FIG. 6 shows a communication flow for exchanging visible images, infrared images, and control commands between the imaging apparatus 100 and the controller apparatus 200 that are shown in FIG. 1. Here, the communication flow may use an original communication protocol, but may use, for example, a protocol or the like formulated by ONVIF (Open Network Video Interface Forum) as standard communication of the surveillance camera.

First, when installed at a predetermined location, connected to the network 303, and then powered on, the imaging apparatus 100 is activated, and the controller 23 of the imaging apparatus 100 executes an initial setting processing. For example, the initial setting processing is mainly activation of hardware and an initial parameter setting processing of software such as loading of a program stored in the memory 21 and acquisition of a current location of the GPS 19. Incidentally, the imaging apparatus may use PoE (Power Over Ethernet), then use a PoE compatible hub, and be activated at timing connected to the network 303 (Step 601).

When the necessary initial setting processing is completed, the controller 23 of the imaging apparatus 100 sets an IP address to be used in the communication controller 15 and the IF 16. The IP address is set by using a general-purpose network protocol through a method of setting a static IP address, a PC and pad terminal, etc. being directly connected in the method by the maintenance IF 22, or through a method of automatically setting an IP address by using a DHCP (Dynamic Host Configuration Protocol) (Step 602).

After completion of the setting of the IP address, the controller 23 of the imaging apparatus 100 instructs the communication controller 15 to notify the controller apparatus 200 of its own presence. Protocols such as UPnP (Universal Plug and Play) and WS-Discovery (Web Services Dynamic Discovery) may be used as a method for automatically discovering an apparatus(es) existing on the network. At a time of such a notification, the controller apparatus may also be set so that the notification includes manufacturer name and type name of the apparatus itself, installation location, date and time, and the like (Step 603). In this case, the installation location may be information initially set in advance or information acquired from the GPS 19. The installation location may also include information on determination of outdoor or indoor location by using the GPS 19 or illuminance monitor 18.

When receiving the notification, a controller 214 of the controller apparatus 200 acquires the IP address of the imaging apparatus 100, and so can recognize the presence of the imaging apparatus 100. The controller 214 notifies the administrator that a new imaging apparatus 100 is connected via a display 202, and waits for an instruction from the administrator as to whether the controller itself manages the new imaging apparatus 100. When receiving an instruction from the administrator via the user IF 201 or when checking the number of imaging apparatuses 100 currently managed and knowing that the checked number does not reach the maximum number, the above controller automatically instructs the communication controller 206 to transmit, to the imaging apparatus 100, an acquisition request of installation function information (Step 605).

The controller 23 of the imaging apparatus 100, which has received the installation-function-information acquisition request, acquires the function information stored in the memory 21, instructs the communication controller 15 to transmit the function information to the controller apparatus 200. For example, the function information includes: apparatus management information (presence/absence of support about a network, a system, and security, and a parameter value), imaging-apparatus performance information (parameter values about image quality such as backlight correction, brightness, contrast, white balance, focus adjustment, or wide dynamic range, and parameter values about media profiles such as resolution, frame rate, and codec type); PTZ (Pan/Tilt/Zoom) function information (definition of coordinate systems, movable parameters, and preset positions, etc.); analysis function information (analysis function to be supported, types of face authentication, and format of analysis results, etc.) (Step 606).

Here, FIG. 7 shows one configuration of information on the imaging apparatus 100 according to the present embodiment. The imaging apparatus 100 of the present embodiment has a "visible image" and an "infrared image" as a classification 701 of an output image and has, as an output mode 702 to be transmitted to the controller apparatus 200, four types of "outputting only a visible image", "outputting only an infrared image", "automatically switching both images to any one based on illumination and time and outputting it", and "simultaneously outputting both of visible and infrared images". Further, as access destination information 703 of the visible image, the controller apparatus 200 has: information on the visible image from the imaging apparatus 100; and URI/URL information accessed for acquiring the actual visible image. Similarly, as access destination information 704 of the infrared image, the controller apparatus 200 has: information on the infrared image from the imaging apparatus 100; and URI/URL information accessed for acquiring the actual infrared image. Additionally, this configuration includes codecs, transfer rates, and resolutions, etc. of the visible images capable of being outputted as visible image information 705, and similarly includes codecs, transfer rates, and resolutions, etc. of the infrared images capable of being outputted as infrared image information 706. This configuration is an example, and may include the other information.

The controller 214 of the controller apparatus 200, which has received the function information of the imaging apparatus 100, notifies the administrator of content of the function information via the display 202 or automatically confirms the content, and adds, as a management target, it to the camera manager 208 when determining to manage the content by the controller apparatus 200. The camera manager 208 stores all or a part of the function information in the memory 204 and manages them or it. Further, the controller 214 confirms the analysis function and the authentication function supported by the controller apparatus 200 itself, and determines whether to utilize the images of the imaging apparatus 100. Alternatively/additionally, the controller 214 confirms the analysis function information supported by the imaging apparatus 100, and may determine an authentication method and an analysis method to be executed when using the imaging apparatus 100 (Step 607).

When determining to utilize the imaging apparatus 100, the controller 214 of the controller apparatus 200: instructs the communication controller 206 in order to set what needs to be changed or set out of the parameters included in the function information acquired in Step 606; and sends an apparatus setting request to the imaging apparatus 100. For example, the present embodiment sets "simultaneously outputting both of the visible and infrared images" as the output mode 702 (Step 608). Here, for example, the output mode 702 may be determined based on the installation location of the imaging apparatus 100.

The controller 23 of the imaging apparatus 100, which has received the apparatus setting request, checks whether the received setting is executable, and returns its execution result to the controller apparatus 200 (Step 609).

Next, the controller 214 of the controller apparatus 200 instructs the communication controller 206 to send an access-destination-information acquisition request for actually acquiring a protocol or parameter necessary for acquiring a visible or infrared image (Step 610).

The controller 23 of the imaging apparatus 100, which has received the access-destination-information acquisition request, instructs the communication controller 15 to return access destination information (e.g., a media type, a port number, transfer protocol, and payload number, etc.) to media including the access destination information 703 of the visible image and the access destination information 704 of the infrared image (Step 611).

The controller 214 of the controller apparatus 200, which has received the access destination information, subsequently sends the imaging apparatus 100 an acquisition request of session information (DESCRIBE) necessary for receiving the images (Step 612).

The controller 23 of the imaging apparatus 100, which has received the session-information acquisition request, instructs the communication controller 15 to generate the session information described by using a SDP (Session Description Protocol), and sends the generated session information to the controller apparatus 200 (Step 613).

The controller 214 of the controller apparatus 200, which has received the session information, instructs the communication controller 206 to establish an RTSP session with the imaging apparatus 100. Here, the RTSP session is normally separately established for transferring the visible image and for transferring the infrared image (Step 614).

After establishing the RTSP session, the controller apparatus 200 prepares to receive these images and prepares for face authentication (Step 615), and the imaging apparatus 100 prepares to transmit a visible or infrared image (Step 616), and sends its result (Step 617).

When confirming that all the preparations are completed, the controller 214 of the controller apparatus 200 instructs the communication controller 206 to transmit a streaming start request (PLAY) to the imaging apparatus 100 (Step 618).

The controller 23 of the imaging apparatus 100, which has received the streaming start request, instructs the signal output controller 14 to output the image requested by the controller apparatus 200 in Step 608, and instructs the communication controller 15 to send the imaging apparatus 100 the images outputted by the signal output controller 14 through the RTP used on the session established in the Step 612/613 (Step 620).

The controller 214 of the controller apparatus 200 also starts receiving the images (Step 621).

Thereafter, the controller 214 performs RTP transfers of the visible and infrared images photographed by the imaging apparatus 100 (Steps 621 and 622). Here, in order to reduce a processing load on a controller apparatus side, the communication controller 15 of the imaging apparatus 100 may use a marker bit of a RTP header so that a break(s) of the frame becomes clear.

Each time the predetermined number of frames is transferred, the communication controller 15 of the imaging apparatus 100 also sends a RTCP transmission report to the controller apparatus 200. The same time stamp, frame number, and packet count, etc. are stored in the report in order to indicate that the visible and infrared images have been captured simultaneously (step 623).

The controller 214 of the controller apparatus 200, which receives the visible and infrared images from the imaging apparatus 100, performs the face authentication by using the moving-object region extractor 209, face area detector 210, face feature point detector 211, and face checker 212 while storing these images in the memory 204 via the recorder/reproducer 205. Then, the controller 214 controls interruption and stop of the streaming as necessary (Step 624).

The above is the basic communication flow between the controller apparatus 200 and the imaging apparatus 100.

Here, the above-mentioned communication flow uses the RTP communication, but may use HTTP communication or another unique communication method. The visible and infrared images may be transferred not by separate streams but by superimposition on the same stream (e.g., a common header (including time stamp and sequence number)+a first visible image+a first infrared image+ . . . , etc.). Additionally, simultaneous transfers of the both images bring an increase of a usage rate of the communication band, so that the infrared and visible images may be transferred every frame and every 30 frames, respectively. Also in this case, frames photographed at the same timing use the same time stamp and frame number for the infrared and visible images.

Here, in Step 623, the imaging apparatus 100 sends a transmission report to the controller apparatus 200. Similarly thereto, however, the controller apparatus 200 may send the imaging apparatus 100 a reception report including information on packet loss and transfer delay.

Additionally, in order to indicate that the visible and infrared images are photographed simultaneously in Step 623, the present embodiment sends the transmission report setting the same time stamp and frame number, but may adopt, for example, a method of setting, to the same value, a time stamp and sequence number of the RTP header to be sent, and a method of setting the same time stamp and frame number to an expansion header of the RTP header.

The controller 214 of the controller apparatus 200 instructs the recorder/reproducer 205 to store the received visible and infrared images in the memory 204, uses the moving-object region extractor 209, face area detector 210, face characteristic point detector 211, and face checker 212 to detect a person(s) included in the image, and performs the face authentication about whether the person is a suspicious individual etc. At this time, the visible and infrared images obtained by photographing the same object at the same timing can be acquired. Further, addition of the same time stamp and sequence number brings a merit of facilitating synchronization of the both images, so that there are a method of face-authenticating the both images to improve authentication accuracy, and a method of normally face-authenticating any one (e.g., only infrared image) of the both images and utilizing the other image having the same sequence number in comparing and confirming the both images (e.g., there are a portion desiring to grasp additional information such as background and color, and a portion desiring to face-authenticating by another image, etc.).

Additionally, the present embodiment sets "simultaneously outputting the both visible and infrared images" as the output mode 702 in Step 608, but may change, depending on a time or a surrounding environment, the above setting to settings such as "simultaneously outputting the both visible and infrared images" in the daytime and "outputting only infrared image" in the daytime. Alternatively, when performing the face authentication simultaneously while receiving any one of the images or when desiring to acquire further information of a person who appears a suspicious individual from a result of the matching by the face checker 212, the present embodiment may automatically switch one case to the other case so as to receive the both images on the way during each case.

When determining presence of a suspicious individual or a candidate for the suspicious individual in the image from a result of verification by the face checker 212, the controller 214 of the controller apparatus 200 notifies the administrator via the display 202 or notifies another controller apparatus 200 via the IF 207 to share information thereon, thereby making it possible to trace the suspicious individual among a plurality of imaging apparatuses 100.

Embodiment 2

Next, described will be a configuration of an imaging system according to Embodiment 2 of the present invention.

Figure 8:
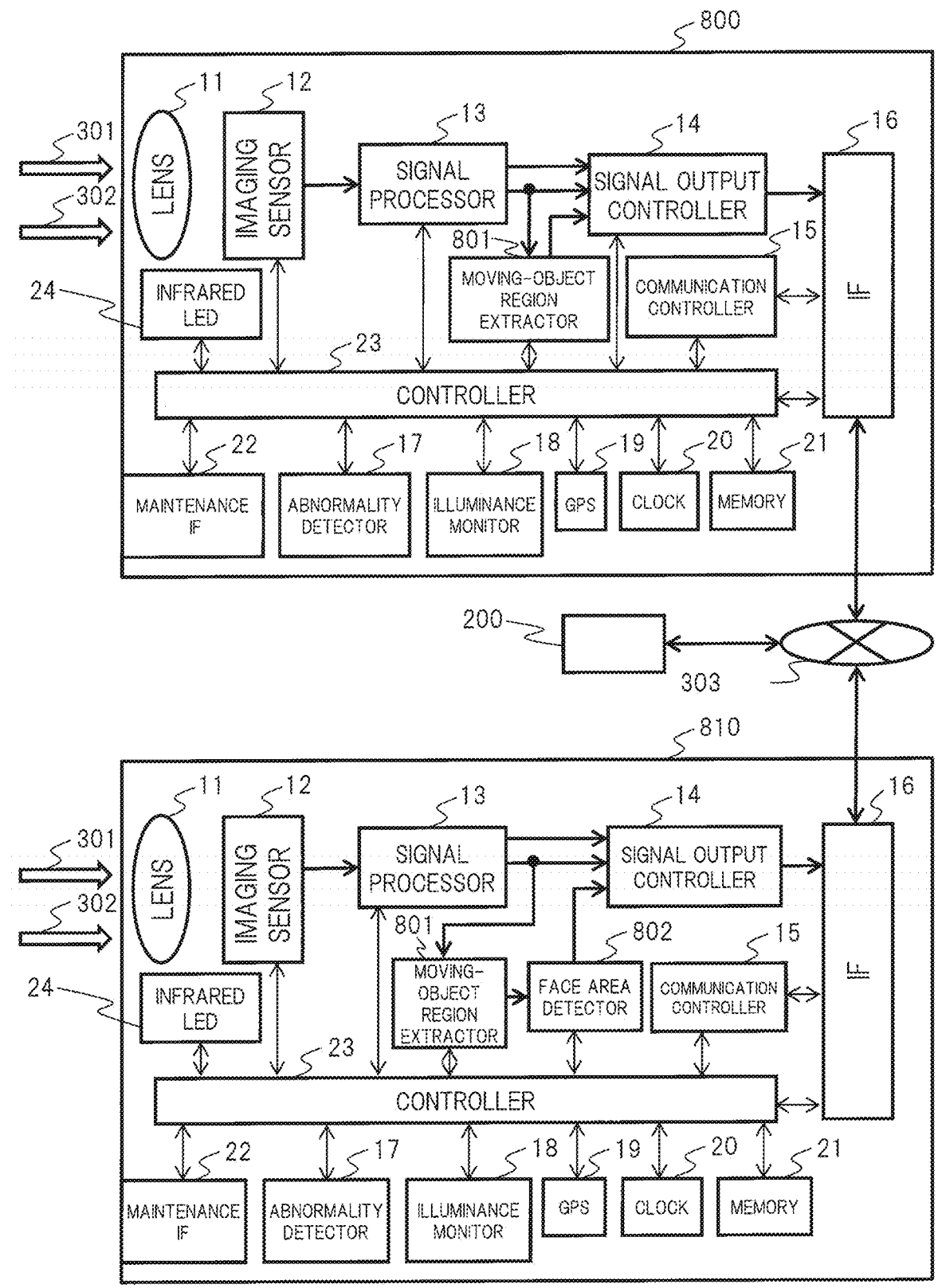
FIG. 8 is a schematic diagram showing an imaging system according to Embodiment 2 of the present invention.

FIG. 8 shows a configuration example of an imaging system according to Embodiment 2 of the present invention. Incidentally, the imaging apparatus 100 of Embodiment 1 described above and the imaging apparatuses 800 and 810 of the present embodiment can be mixed and installed on the same imaging system, and the controller apparatus 200 can manage these imaging apparatuses.

The imaging apparatus 800 of the present embodiment has a configuration in which a moving-object region extractor 801 having almost the same function as the moving-object region extractor 209 of the controller apparatus 200 is mounted on the imaging apparatus 100 of Embodiment 1 described above. A configuration other than the above configuration has almost the same components as those of the imaging apparatus 100.

The controller 23 of the imaging apparatus 800 inputs, to the moving-object region extractor 801, only the infrared image among the visible and infrared images outputted from the signal processor 13. Reasons for using only the infrared image include: the ability to detect objects that cannot be detected with the visible image; the fact that contrast between a human being and the background is greater in amount than that of the visible image and is effective for human detection; and the like.

The moving-object region extractor 801 extracts a moving-object region(s) in the image by using the inputted infrared image, and outputs its number and position information. These results are outputted to the controller 25 or the signal output controller 14. The results may be also stored in the memory 22.

As described above, the above-mentioned imaging apparatus 800 always monitors the moving-object region in the image by using the infrared image among the visible and infrared images photographed at the same timing, and can provide, together with the visible or infrared image, the controller apparatus 200 with information on the moving-object region extracted with high accuracy. The controller apparatus 200 can acquire information on the moving-object region together with the image, and so can reduce an image processing burden.

Here, in order to reduce an amount of usage of the communication band on the network, the controller 23 of the imaging apparatus 800: outputs the image(s) from the signal output controller 14 via the IF 16 only when the moving-object region extractor 801 extracts a moving-object region(s); and may not output the image from the signal output controller 14 or may lower a frame rate of the image outputted from the signal output controller 14 when the moving-object region extractor 801 can extract no moving-object region.

Additionally, the controller 23 of the imaging apparatus 800 may combine the moving-object region extracted by the moving-object region extractor 801, and the visible and/or infrared images outputted by the signal processor 13, and instruct the signal output controller 14 to generate/process, on such an image, an image surrounding the moving-object region in a rectangle.

Similarly, the imaging apparatus 810 of the present embodiment has a configuration in which a face area detector 802 having almost the same function as that of the face area detector 210 of the controller apparatus 200 is mounted on the above-mentioned imaging apparatus 800. The other components have the same configuration as the imaging apparatus 100. A configuration other than the above configuration has almost the same components as those of the imaging apparatus 100.

The controller 23 of the imaging apparatus 810 inputs, to the moving-object region extractor 801, only the infrared image out of the visible and infrared images outputted by the signal processor 13. The moving-object region extractor 801 extracts a moving-object region(s) in the image by using the inputted infrared image, and outputs its number and position information to the controller 23 or signal output controller 14 and simultaneously inputs them to the face area detector 802. The face area detector 802 detects an area where a human face(s) exists from the inputted moving-object region, and outputs the detected area to the controller 23 or signal output controller 14.

As described above, the imaging apparatus 810 can: always monitor the moving-object region in the image by using the infrared image out of the visible and infrared images photographed at the same timing; extract the moving-object region with high accuracy; further detect the area where the human face exists from the moving-object region; and provide, together with the visible or infrared image, the controller apparatus 200 with the information of the moving-object region and the information of the face area. The controller apparatus 200 can acquire these pieces of information together with the image, and so reduce the image processing burden.

Here, in order to reduce an amount of usage of the communication band on the network, the controller 23 of the imaging apparatus 810: outputs an image(s) via the IF 16 from the signal output controller 14 only when the face area detector 802 detects a face area(s) of a person(s); and may not output the image from the signal output controller 14 or may reduce a frame rate of the image outputted from the signal output controller 14 when the face area detector 802 can extract the moving-object region, but cannot detect the face area of the person. Similarly, in order to detect only an object, the controller 23 of the imaging apparatus 810 may output an image from the signal output controller 14 via the IF 16 only when the face area detector 802 detects the moving-object region in which the face area of the person cannot be detected.

Further, the controller 23 of the imaging apparatus 810 may compare the face area extracted by the face area detector 802 (and the moving-object region extracted by the moving-object region extractor 801) and the visible image and/or infrared images outputted by the signal processor 13, and instruct the signal output controller 14 to generate/process, on such an image, an image surrounding the moving-object region in a rectangle.

The communication flow between each of the imaging apparatuses 800 and 810 and the controller apparatus 200 is substantially the same as the content described in FIG. 6 of Embodiment 1, so that only a difference therebetween will be described below.

First, in Step 606 of FIG. 6, function information with which the imaging apparatuses 800 and 810 provide the controller apparatus 200 is added, as an example, to the information shown in FIG. 7, and the information as shown in FIG. 9 is provided as the above-described analysis function information. That is, the function information contains: content indicating that the imaging apparatus 800 itself installs a "moving-object region extraction function"; and contents indicating that the imaging apparatus 801 installs a "moving-object region extraction function" and a "face area detection function".

In the present embodiment, these pieces of information are set as analyzed metadata, and contain: a classification 901 of the analyzed metadata shown in FIG. 9 and servicing as function information (analysis function information); an output mode 902 of the analyzed metadata; access destination information 903 of moving-object-region metadata; access destination information 904 of face-area metadata; access destination information 905 of moving-object-region/face-area metadata; information 906 of moving-object-region metadata; and information 907 of face-area metadata.

In Step 607, the controller 214 of the controller apparatus 200, which has received the function information, confirms an analysis function and an authentication function supported by the controller apparatus 200 itself, and determines whether to use the analyzed metadata outputted from the imaging apparatus 800. This makes it possible to select, for example, use of only "position information of moving-object region" of the analyzed metadata for both of the imaging apparatuses 800 and 810, or use of only the "position information of face area" of the analyzed metadata in the imaging apparatus 810 without using the analyzed metadata of the imaging apparatus 800.

Figure 10:
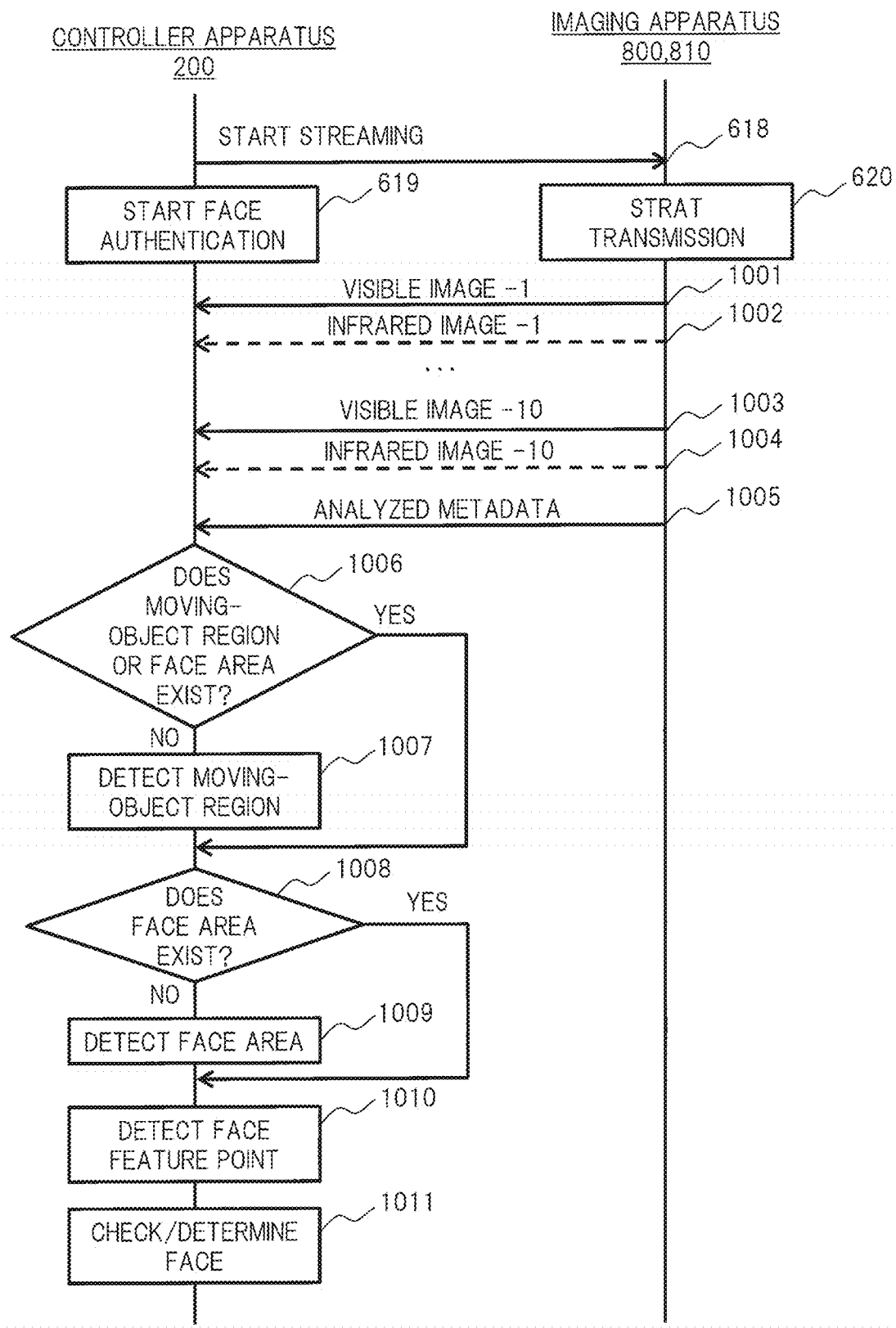
FIG. 10 is a flowchart for explaining a communication flow between a camera and a controller of the imaging system according to Embodiment 2 of the present invention.

FIG. 10 shows a communication flow for transmitting a visible image, an infrared image, and analyzed metadata between each of the imaging apparatus 800 and 810 and the controller apparatus 200. In this explanation, it is assumed that the imaging apparatus 800 transmits analyzed metadata of the "moving-object-region position information" and the imaging apparatus 810 transmits both of analyzed metadata of the "moving-object-region position information" and analyzed metadata of "face-area position information". The imaging apparatuses 800 and 810 also establish a session for transferring the analyzed metadata additionally to the visible and infrared images in Step 614 of FIG. 6.

The imaging apparatuses 800 and 810 start frame transfers of the visible and infrared images (Steps 1001 and 1002). Each time the predetermined number of frames is transferred (Steps 1003 and 1004), the imaging apparatuses 800 and 810 transmit the analyzed metadata extracted by the moving-object region extractor 801 and the face area detector 802 (Step 1005). Here, the analyzed metadata may be sent at the timing when the moving-object region or face area is detected.

The controller 214 of the controller apparatus 200, which has received the analyzed metadata 1200, checks whether the analyzed metadata 1200 includes information on a moving-object region(s) or information on a face area(s) (Step 1006). Then, if the information on the moving-object region is not included, the controller 214 uses its own moving-object region extractor 209 to perform an extraction processing of the moving-object region (Step 1007).

Meanwhile, when information of the moving-object region or face area is included, the controller 214 confirms whether information on the face area is included (Step 1008). Then, if the information on the face area is not included (that is, only information on the moving-object region is included), the controller 214 uses the received information on the moving-object region and its own face area detector 210 to perform a detection processing of the face area (Step 1008).

On the other hand, when information on the face area is included, the controller 214 uses the received information on the face area and its own face-feature point detector 211 to extract a face feature point(s) (Step 1010), and uses the face checker 212 to perform face matching therewith (Step 10100).

FIG. 11 shows image pictures handled by the imaging apparatuses 800 and 810. An image 1100 is an example of a visible image photographed by the imaging apparatuses 800 and 810. An image 1101 is obtained by removing a background from the image 1100, thereby extracting only the moving-object region. In this image example, three areas (portions each surrounded by a broken-line square) of (A), (B), and (C) can be extracted. An image 1102 is obtained by further extracting a face area from the image 1101. In this example image, two areas (portions each surrounded by a solid square) of (a) and (b) can be extracted.

Figure 12:
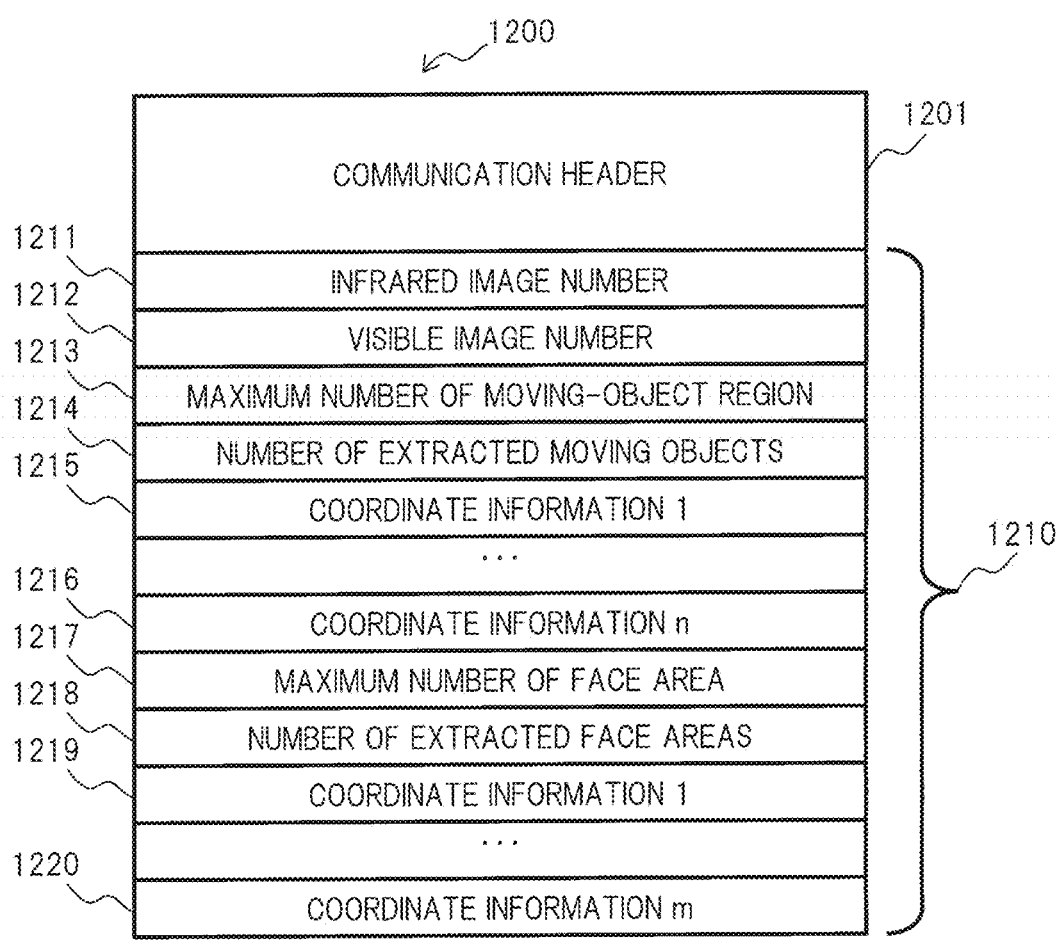
FIG. 12 is a diagram showing one configuration example of pieces of analysis metadata information handled by the imaging system according to Embodiment 2 of the present invention.

FIG. 12 shows a configuration example of analyzed metadata 1200 sent by the imaging apparatuses 800 and 810 in Step 1005.

The analyzed metadata 1200 is roughly composed of a communication header 1201 and a payload 1210. The communication header 1201 is, for example, similar to the RTP header, the HTTP header, and the like.

The analyzed metadata is stored in the payload 1210. For example, the payload is configured by: a frame number 1211 of the infrared image used for extracting the moving-object region or face area; a frame number 1212 of the visible image; the maximum number 1213 of the moving-object regions extractable by the imaging apparatuses 800 and 810; a moving-object-region extraction number 1214 (n in this case) actually extracted by the moving-object region extractor 801; coordinate information 1 to n (1215 to 1216) of the extracted moving-object region; a face-area extraction number 1218 (m≤n in this case) actually extracted by the face-area detector 802; and coordinate information 1 to m (1219 to 1220) of the extracted moving-object region.

As described above, in addition to the visible and infrared images, the imaging apparatuses 800 and 810 of the present embodiment can provide, simultaneously with a necessary image output(s), the controller apparatus 200 with information on moving-object regions and/or information on human areas that have been accurately extracted by using the infrared images.

Meanwhile, the controller apparatus 200 can omit a conventional procedure(s) by using the received information of the moving-object region and human area immediately, thereby making it possible to reduce an execution time of the face authentication shorter than a conventional execution time. This is effective in reducing the processing load of the controller apparatus 200 when many imaging apparatuses are managed by one controller apparatus 200.

Here, the present embodiment describes an example in which the imaging apparatuses 800 and 810 transmit, to the controller apparatus 200, at least any one of the visible and infrared images and the analysis parameters. However, in order to reduce an amount of data on the network, the present embodiment may transmit the analysis parameters and an image(s) of only a portion(s) (moving-object region and face area) indicated by the analysis parameters.

Additionally, when the moving-object region in the image is first detected by the moving-object region extractor 801, the controller 23 of the imaging apparatuses 800 and 810 may: hold a frame number of the corresponding image; track a target of the moving-object region from images photographed sequentially to the above image until the target does not exist; and add the above frame number as attribute information of the coordinate information in the analyzed metadata 1200 shown in FIG. 12. This makes it possible to easily grasp the frame number included in the moving-object region and calculate a time since the controller apparatus 200 refers to the analyzed metadata 1200.

Embodiment 3

Next, described will be a configuration of an imaging system according to Embodiment 3 of the present invention.

The imaging apparatuses according to Embodiments 1 and 2 described above have photographed the visual and infrared images by using one set of lens 11, an imaging sensor 12, and a signal processor 13. An imaging apparatus of the present embodiment has a configuration in which two sets of lenses 11, an imaging sensor 12, and a signal processor 13 are arranged on each of right and left sides, thereby making it possible to take stereo images (distance images) composed of two right and left images by each of visible light and infrared light.

Figure 13:
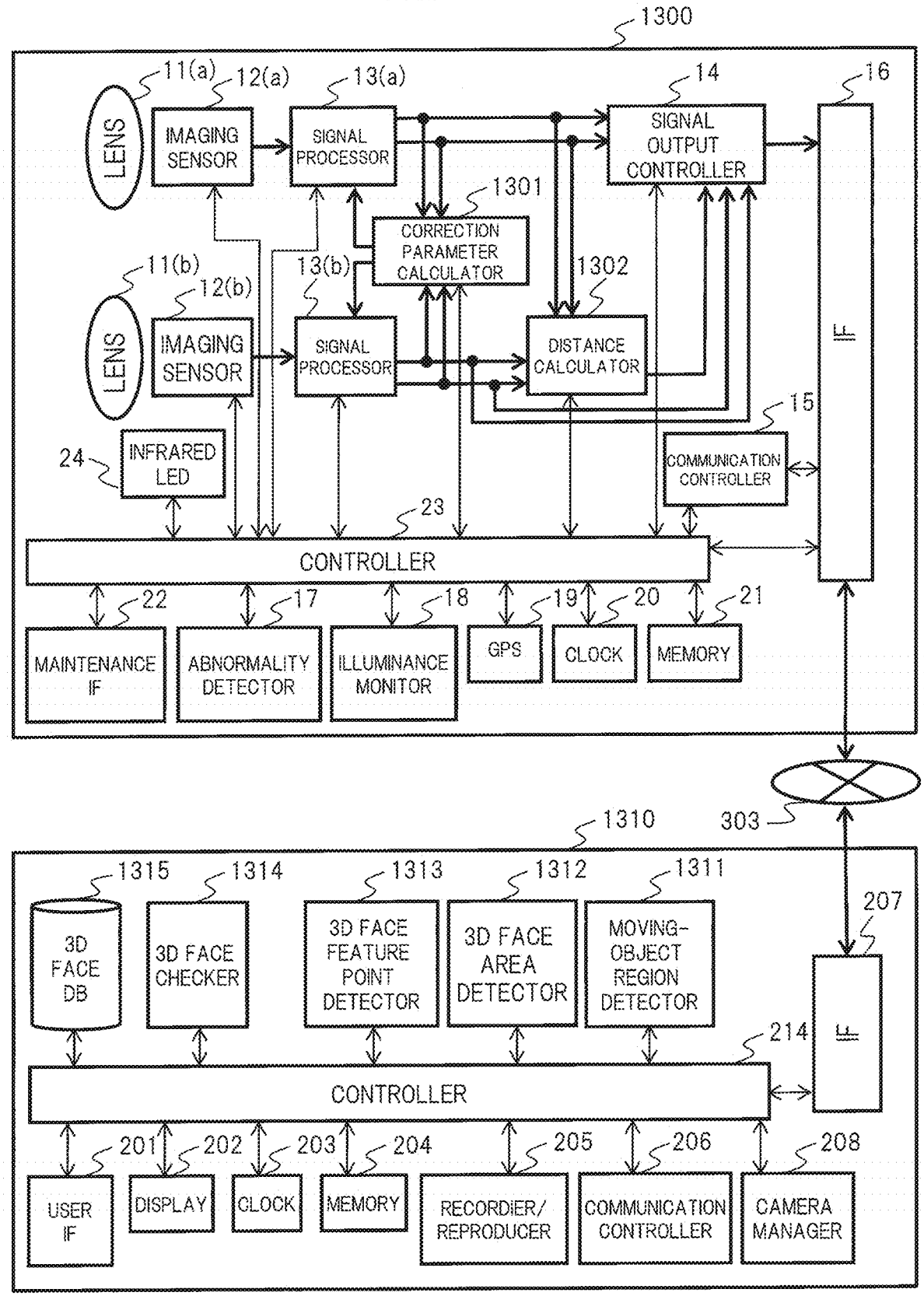
FIG. 13 is a schematic diagram showing an imaging system according to Embodiment 3 of the present invention.

FIG. 13 shows a configuration example of the imaging system of the present embodiment. This imaging system includes one or more imaging apparatuses 1300 and a controller apparatus 1310.

As described above, the imaging apparatus 1300 includes the two sets of lenses 11, the imaging sensor 12, and the signal processor 13, and newly includes a correction parameter calculator 1301 and a distance calculator 1302. The two lenses 11(a) and 11(b) are arranged on right and left sides so that their optical axes are parallel to each other. A configuration other than the above configuration basically has almost the same components as those of the imaging apparatuses 100, 800, and 810 of Embodiments 1 and 2.

The correction parameter calculator 1301 sets a parameter such as a correction value (e.g., a correction value added to, subtracted from, multiplied by, or divided by signals such as a visible and infrared image signals, an infrared signal, and each color signal) of a clip level or a signal level so as to approximate signal strengths (signal levels) of respective visible images outputted from the two signal processors 13 (a) and 13 (b) so that two visible image signals (two infrared image signal) approximate about their signal levels. Correction amounts of the image signal correction processor 203 are each set in view of outputs from the two signal processors 13 (a) and 13(b), so that levels of the image signals are matched. A processing of matching the levels of the right and left image signals can be performed to both of the infrared and visible image signals.

That is, the correction parameter calculator 1301 determines the correction amount based on the signal levels of the image signals outputted from the two signal processors 13(a) and 13(b) so that the signal levels of the image signals outputted from the two signal processors 13(a) and 13(b) are approximated. Consequently, for example, even if luminance levels of two pieces of image data are different, different portions in a subject to be photographed are recognized as the same portion (corresponding points), which makes it possible to suppress an error(s) occurring about a distance to be measured, and occurrence of its error.

The distance calculator 1302 calculates a distance to an object by using the two visible or infrared image signals respectively inputted from the two signal processors 13(a) and 13 (b). At this time, the distance calculator 1302 determines the same to-be-photographed subject (corresponding point) from the two images, and detects a parallax (disparity) as a positional difference of the same to-be-photographed subject onto the image, thereby obtaining the distance similarly to a conventional technique. That is, the corresponding points for measuring the parallax are determined by image recognition, and the distance is calculated based on a parallax that is a difference between positions of the corresponding points in the image. Then, a stereo image (distance image) is generated based on the distance information corresponding to each pixel, and is outputted to the signal output controller 14.

The signal output controller 14 can provide the controller apparatus 1310 with the stereo image (distance image) generated by the above-mentioned distance calculator 1302 additionally to the two visible and infrared images photographed on the right and left sides.

As described above, the present imaging apparatus 1300 makes it possible to simultaneously acquire the visible and infrared images of the to-be-photographed subject, and calculate the distance from both of the images. At this time, matching a position of the visible image with that of the infrared image makes it possible to prevent the distance measured between the both images from varying.

Figure 22:
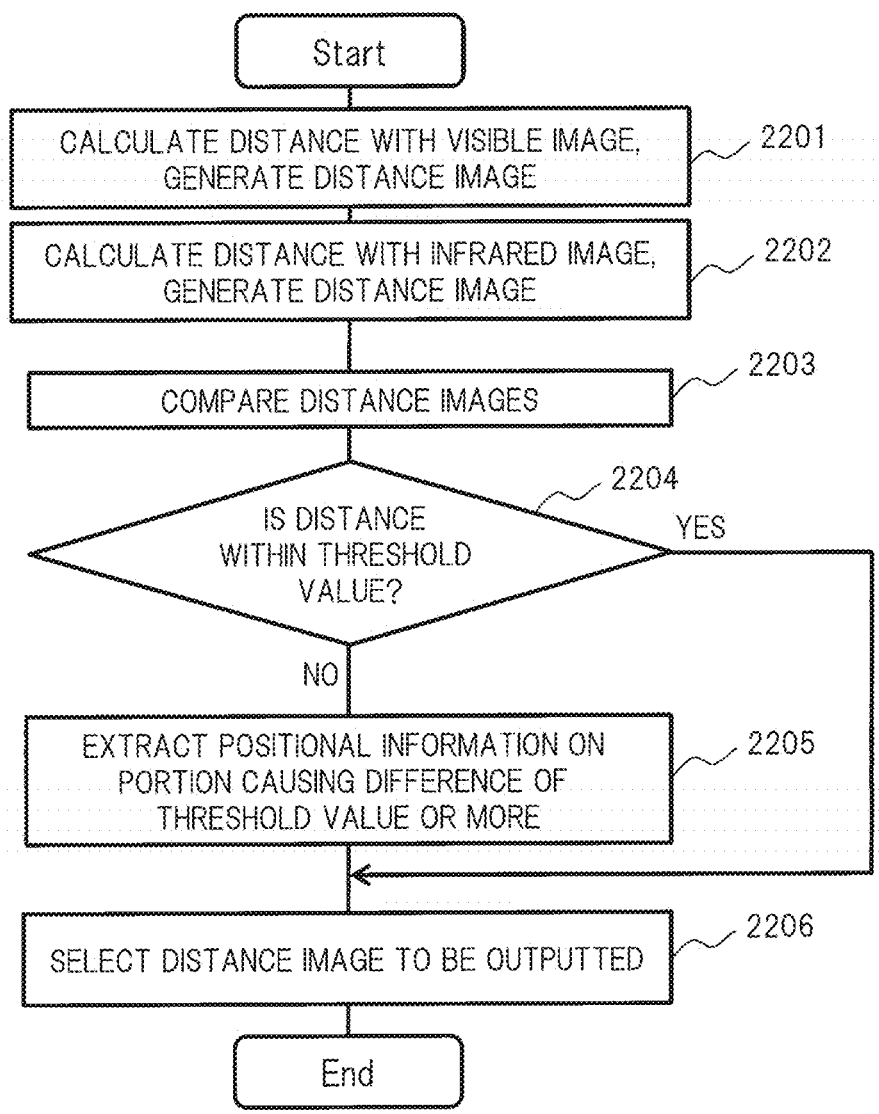
FIG. 22 is a diagram showing a processing flow of an imaging apparatus in the imaging system according to Embodiment 3 of the present invention.

Here, the above-mentioned distance calculator 1302 uses two visible images and two infrared images to calculate the respective distances, and then generates two stereo images (distance images) to output them as they are. Alternatively, the distance calculator 1302 may: compare the two generated stereo images to output a distance image of any one stereo image if a difference between their pieces of distance information is within a threshold value and to output distance images of both stereo images if the difference therebetween exceeds the threshold value; output a distance image(s) (e.g., a distance image calculated with an infrared image being prioritized, and a distance image showing a value close to a distance, etc.) previously set for output; or separately output, as analyzed metadata, an area portion exceeding the threshold value. FIG. 22 shows an example of a processing outline of the distance calculator 1302.

In accordance with an instruction from the controller apparatus 200, the controller 23 of the present imaging apparatus 1300 uses the signal output controller 14 to control an image(s), which is outputted via the IF 16, among the visible and infrared images outputted from the two signal processors 13(a) and 13(b) and the stereo images (distance images) outputted from the distance calculator 1302. For example, the following use becomes possible: when the present imaging apparatus 1300 is installed in a place (e.g., a toilet or changing room) requiring private protection, only the stereo image is outputted; and when the imaging apparatus 1300 is installed in a place requiring high security, all the images are outputted.

Meanwhile, in order to use the stereo image (distance image) additionally to the visible and infrared images or use only the stereo images to perform the analysis and authentication processings, the controller apparatus 1310 mounts a different moving-object region extractor 1311, face area detector 1312, face feature point detector 1313, face checker 1314, and 3D face DB 1315 instead of the moving-object region extractor 209, face area detector 210, face feature point detector 211, face checker 212, and face DB 213 of the controller apparatus 200 according to Embodiments 1 and 2. This makes it possible to, for example, acquire three-dimensional data on irregularities (concave and convex) of the face in performing the face recognition, and accurately and easily detect the face area and the face feature point by using the acquired data.

Further, the controller apparatus 1310 acquires the stereo image (distance image) from the imaging apparatus 1300, thereby referring to the distance of the moving-object region extracted by the moving-object region extractor 209 and making it possible to judge whether to perform the face authentication if the distance is within a predetermined distance or to perform no face authentication if not.

Figure 23:
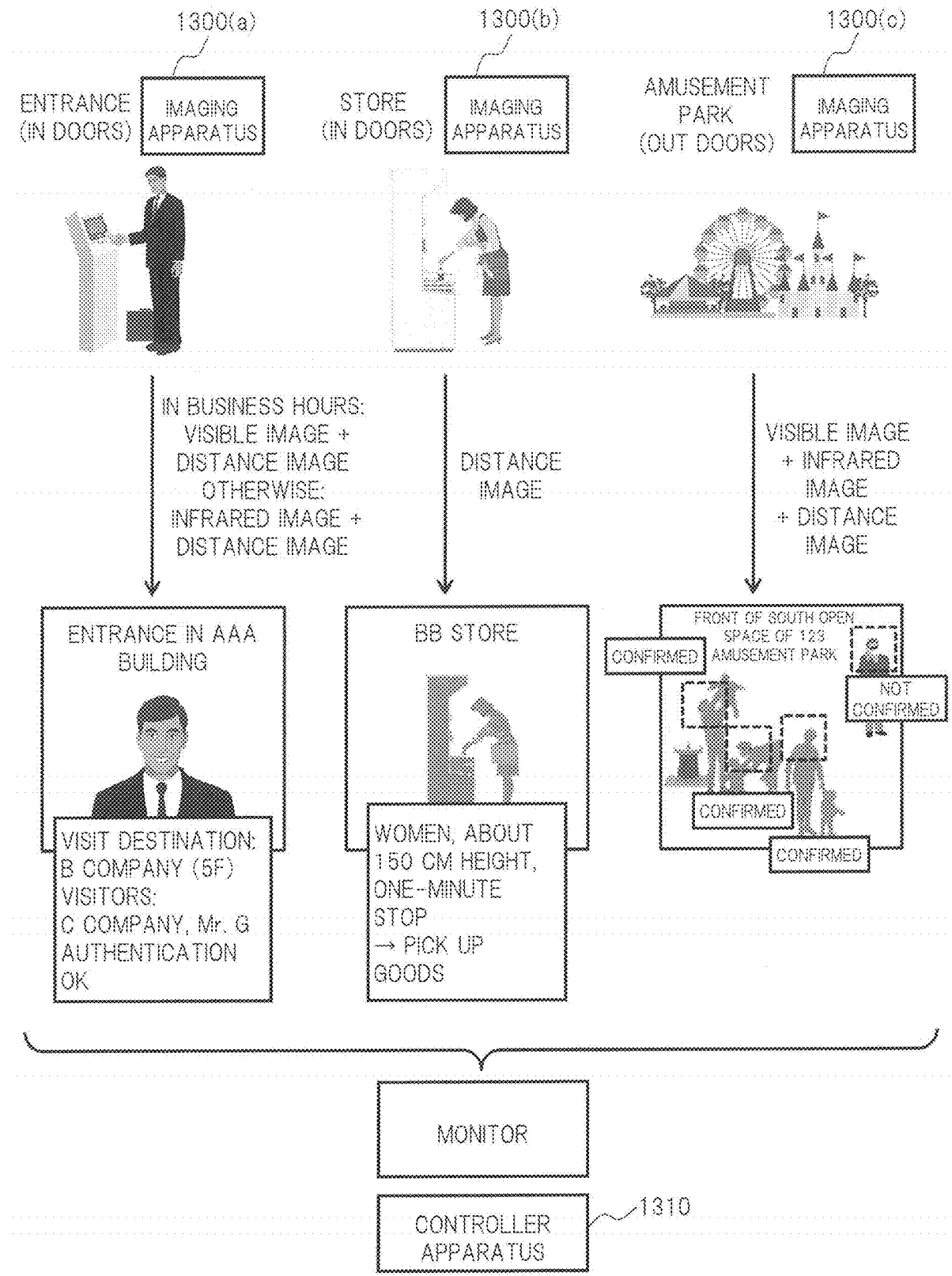
FIG. 23 is an example of employing the imaging system according to Embodiment 3 of the present invention.

FIG. 23 shows examples for displaying states of the imaging apparatuses 1300(a), 1300(b), and 1300(c) whose installation locations are different from that of the controller apparatus 1310. The controller apparatus 1310 uses the visible or infrared image and the distance image that are received from the imaging apparatus 1300 (a) installed at an entrance of an office, building, or the like, performs 3D-based face authentication, and displays its authentication result(s). This facilitates confirmation of visitors and suspicious individuals, which is useful for solving congestion at a reception(s). Further, the controller apparatus 1310 uses the distance image received from the imaging apparatus 1300 (b) installed in a shop of a public facility, commercial facility, or the like, and displays information on the number of people viewing a merchandise shelf(s) or information (e.g., sex, height, face direction, body direction, and attitude, etc.) on a range in which the person cannot be specified. This is useful for judgment of a degree of interest etc. from constituency, a line of sight, or an attitude of a shopper, and for sales capabilities enhancement/marketing about merchandise or display. The controller apparatus 1310: uses the visible, infrared, and distance images received from the imaging apparatus 1300(c) installed on an outdoor place of an amusement park, a park, or the like; extracts a person(s) from the images, performs a 3D-based face authentication; and displays, when the person is confirmed as a previously registered person, the confirmed person with a distance image(s) and only the not-confirmed person with a visible or infrared image(s). Alternatively, the controller apparatus 1310 displays information (e.g., sex, height, facial direction, child accompanying state, and attitude, etc.) on a range in which a person cannot be specified. This is useful for safety security of visitors and early detection of suspicious person.

Figure 14:
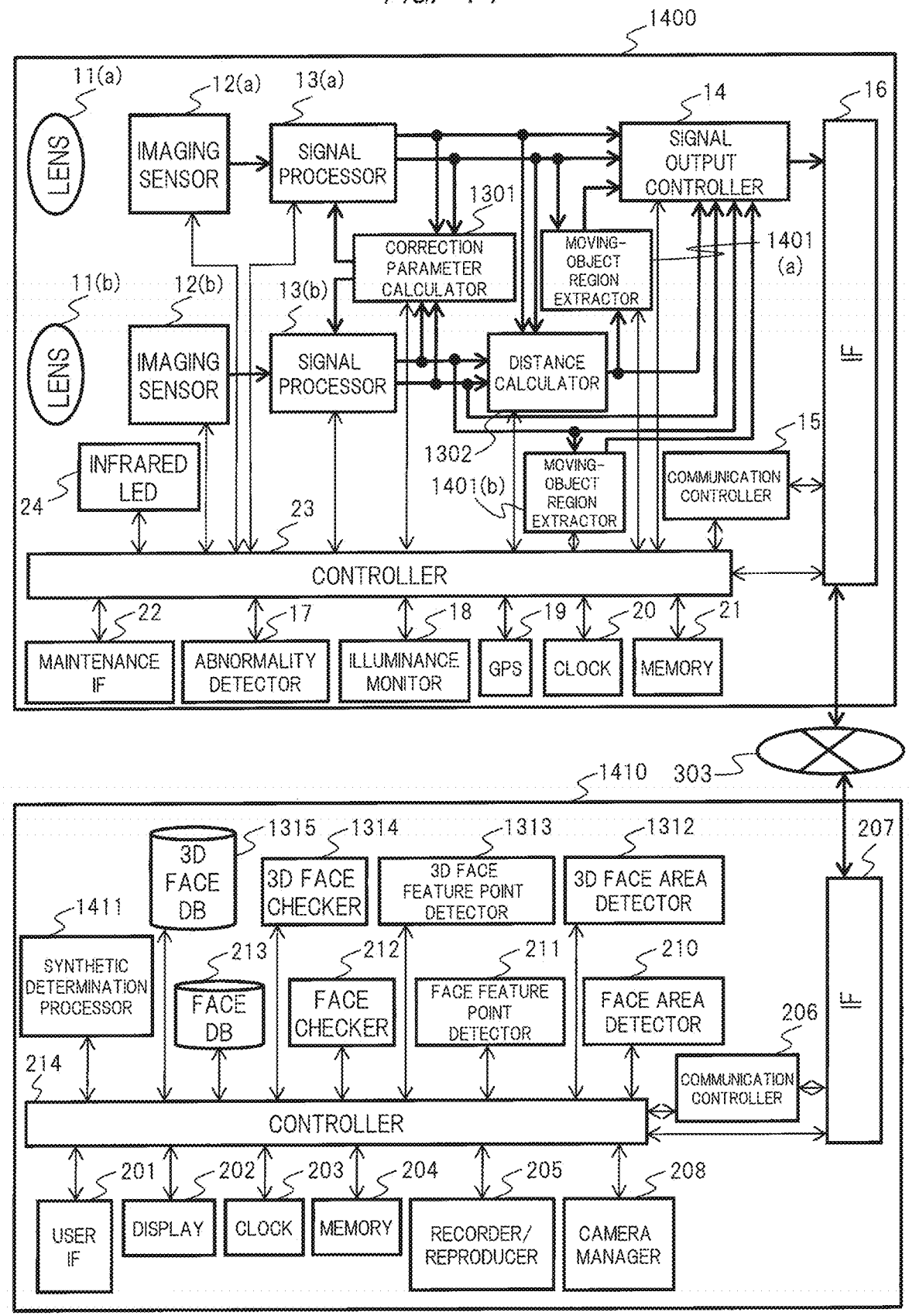
FIG. 14 is a schematic diagram showing another configuration example of the imaging system according to Embodiment 3 of the present invention.

Next, FIG. 14 shows another configuration example of the imaging system of the present embodiment. This imaging system is configured by one or more imaging apparatuses 1400 and a controller apparatus 1410. The imaging apparatus 100 of Embodiment 1, the imaging apparatuses 800 and 810 of Embodiment 2, and the above imaging apparatus 1300 may be mixed on the network 303 although not shown. The controller apparatus 1410 can manage all of the above imaging apparatuses.

The imaging apparatus 1400 mounts two moving-object region extractors 1401(a) and 1401(b) on the imaging apparatus 1300. The moving-object region extractor 1401 may be similar to the moving-object region extractor 1311 of the above-mentioned controller apparatus 1310. A configuration other than the above configuration has almost the same components as those of the imaging apparatus 1300.

The moving-object region extractors 1401(a) and 1401(b) are units configured to use the infrared images outputted from the two signal processors 13(a) and 13(b) to extract a moving-object region from each of the images. Information on these extracted moving-object regions can be outputted to the signal output controller 14 or the controller 23 and provided to the controller apparatus 1410 similarly to Embodiment 2 described above. The moving-object region extractors 1401 (a) and 1401(b) also use the stereo images (distance images) outputted from the distance calculator 1302 to extract moving-object regions, and can extract the moving-object regions with high accuracy by comparing their results with the above method. Alternatively, the moving-object region extractors may firstly use stereo images (distance images) to extract moving-object regions, and then use infrared images to confirm in more detail only a part(s) of the extracted moving-object regions.

Here, the controller 23 can also refer to the information on the two moving-object regions outputted from the moving-object region extractors 1401(a) and 1401(b), compare a number(s) and position(s) extracted, and transmit their comparison results as analyzed metadata. The controller apparatus 1410 can utilize the analyzed metadata and make a selection about which of the right and left visible or infrared images are used for face authentication. For example, regarding results of the extraction of the moving-object regions by the moving-object region extractors 1401(a) and 1401(b), if the result of the extraction by the moving-object region extractor 1401(a) (or moving-object region extractor 1401(b)) is larger in number of moving-object regions, the controller 23 of the imaging apparatus 1400 sends information on the moving-object region extracted by the moving-object region extractor 1401(a) (or moving-object region extractor 1401(b)), and the visible or infrared image outputted from the signal processor 13(a) (or signal processor 13(b)).

Meanwhile, the controller apparatus 1410 mounts, on the controller apparatus 1310, the face area detector 210, face feature point detector 211, face checker 212, and face DB 213 of the controller apparatus 200 described in Embodiment 1, and a synthetic judgment unit 1411.

This makes it possible for the imaging apparatus 1400 to combine and perform: a face authentication processing (using the visible and infrared images), which uses the face area detector 210, face feature point detector 211, face checker 212, and face DB 213 described in Embodiment 1; and a face authentication processing (using a visible, infrared, and stereo images) that uses the face area detector 1312, face feature point detector 1313, face checker 1314, and 3D face DB 1315 as described above. The synthetic determination processor 1411 is a unit configured to perform final judgement of a person authentication result(s) based on results of performing both of the face authentication processings. Performing two different kinds of face authentication methods as described above makes it possible to perform the face authentication with higher accuracy.

Figure 15:
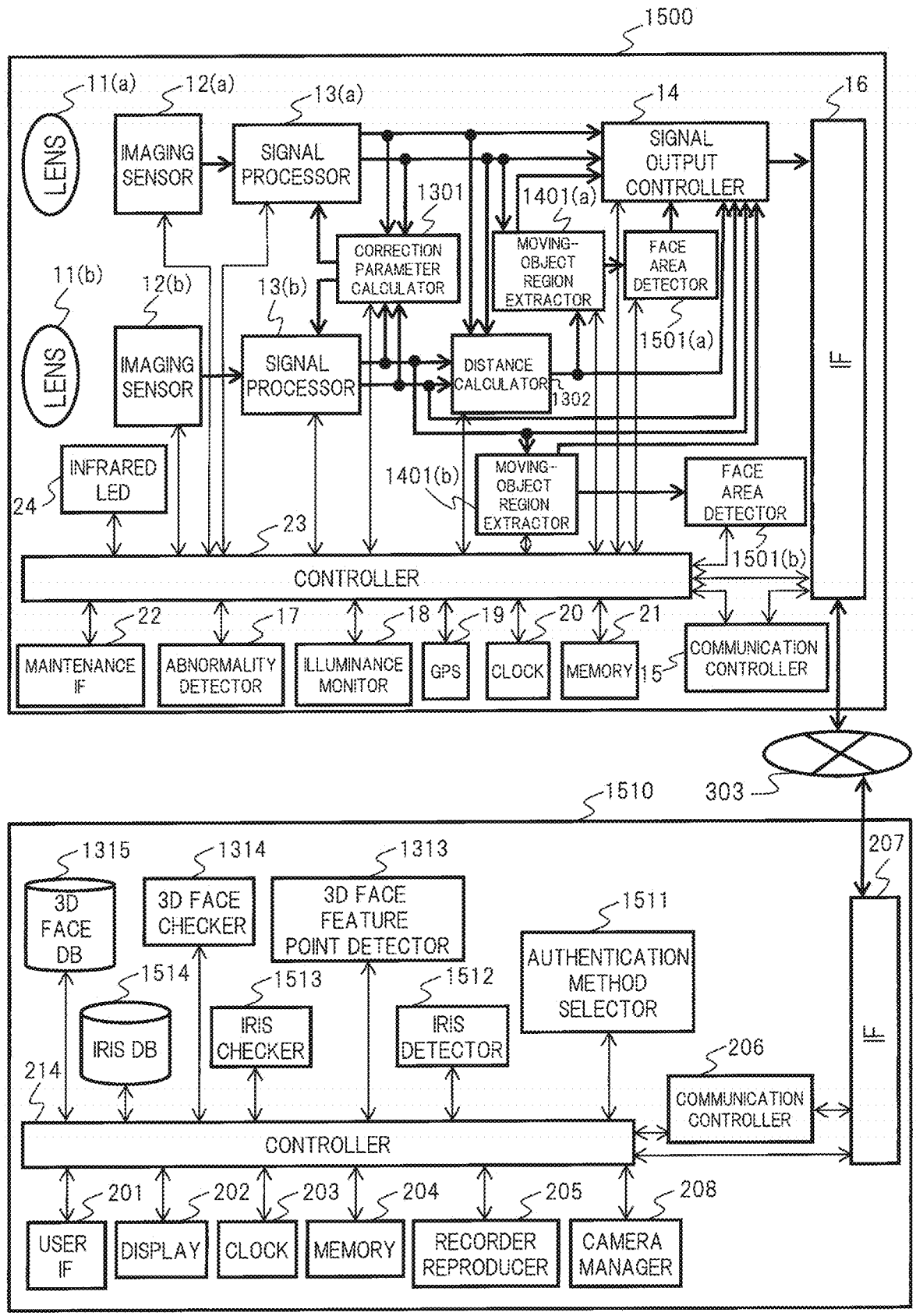
FIG. 15 is a schematic diagram showing another configuration example of the imaging system according to Embodiment 3 of the present invention.

Similarly, FIG. 15 shows yet another configuration example of the imaging system of the present embodiment. This imaging system is configured by one or more imaging apparatuses 1500 and a controller apparatus 1510. The imaging apparatus 100 of Embodiment 1, imaging apparatuses 800 and 810 of Embodiment 2, and imaging apparatuses 1300 and 1400 may be mixed on the network 303 although not shown. The controller apparatus 1510 can manage all of the above imaging apparatuses.

The imaging apparatus 1500 mounts two face area detectors 1502(*a*) and 1502(*b*) on the imaging apparatus 1400. This face area detector 1502 may be similar to the face area detector 1312 of the controller apparatus 1310. A configuration other than the above configuration has the same components as those of the imaging apparatus 1400.

The face area detectors 1501(*a*) and 1501(*b*) are units configured to use information on the moving-object regions outputted from the two moving-object region extractors 1401(*a*) and 1401(*b*) to extract a face area of a person. Information on these extracted face areas can be outputted to the signal output controller 14 or controller 23, and provided to the controller apparatus 1510 similarly to Embodiment 2 described above.

Here, the controller 23 can: refer to the information on the two face areas outputted from the face area detectors 1501(*a*) and 1501(*b*); compare a number(s) and position(s) extracted and then a face direction(s); and transmit their compared results as analyzed metadata. The controller apparatus 1510 uses the analyzed metadata, and selects an image(s) more suitable for face authentication, thereby making it possible to perform the face authentication with higher accuracy.

Meanwhile, the controller apparatus 1510 newly mounts, on the controller apparatus 200 or controller apparatus 1410, an authentication method selector 1511, iris detector 1512, iris checker 1513, and iris DB 1514.

The authentication method selector 1511 is a unit configured to use the visible, infrared, and stereo images (distance image) and the analysis parameter information, etc. received from the imaging apparatus 1500 to make a selection about which of the face authentication and iris authentication should be performed. For example, the authentication method selector performs the iris authentication if an object falls within a predetermined distance range, and performs the face authentication if otherwise. Alternatively, the authentication method selector normally performs the face authentication, and further performs the iris authentication when complying with a condition(s) capable of the iris authentication.

The iris detector 1512 uses the infrared image received from the imaging apparatus 1500 and the analysis parameter including the face area extracted from the image to detect iris positions of human eyes, further detect a boundary between an iris and an white eye and a boundary between the iris and a pupil, determine (identify) an iris area(s), and generate a pupil cord(s). Incidentally, applied to those methods may be any of well-known methods.

Based on the information detected by the iris detector 1512, the iris checker 1513 uses the iris DB 1514 to perform matching similarly to the face authentication.

This makes it possible for the controller apparatus 1510 to use the visible, infrared, and stereo images (distance image) received from the imaging apparatus 1500, and the analysis parameter information, etc. to select optimum biometric authentication, which makes it possible to perform personal authentication with higher accuracy.

Figure 24:
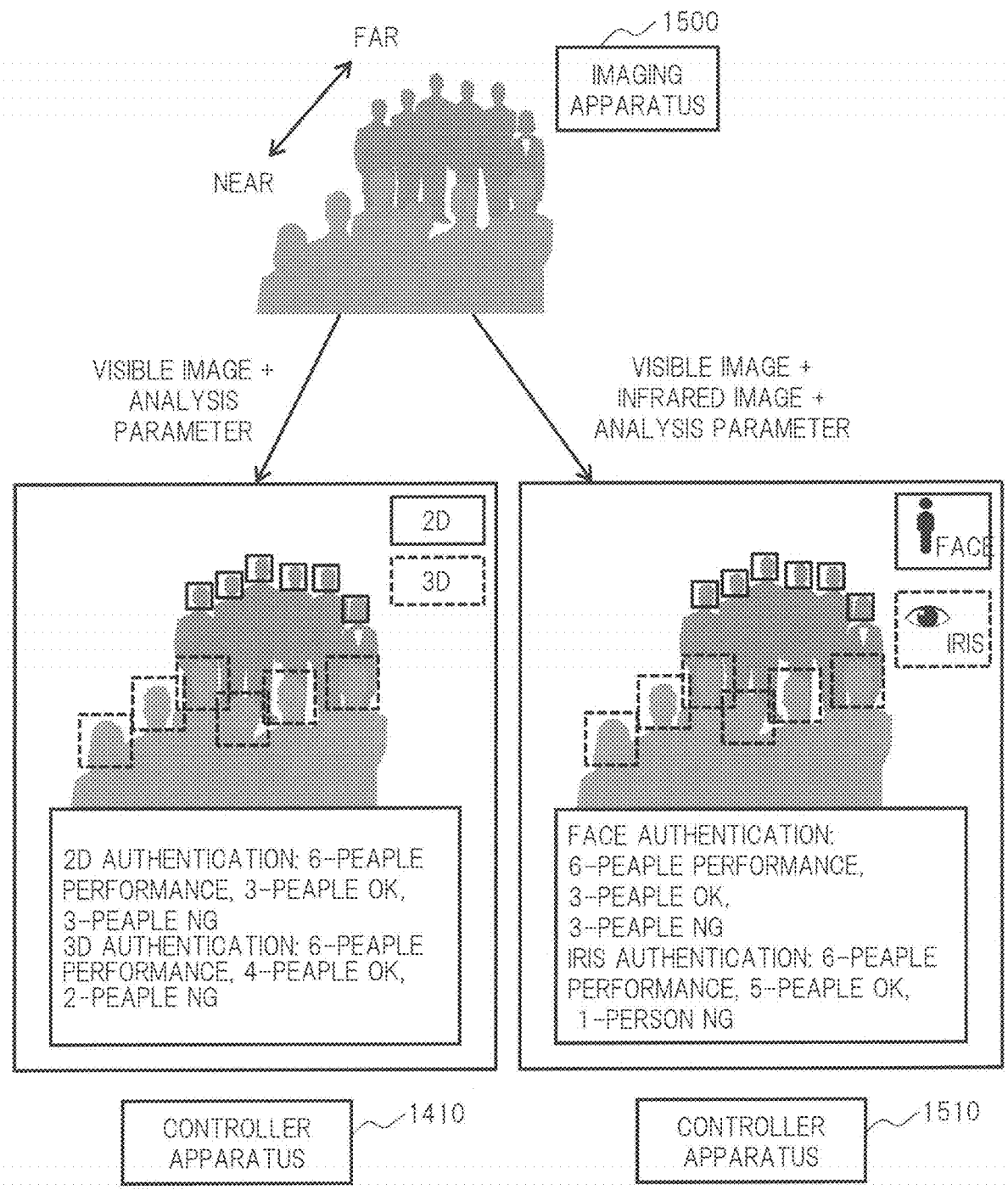
FIG. 24 is an example of employing the imaging system according to Embodiment 3 of the present invention.

FIG. 24 shows an example in which the controller apparatuses 1410 and 1510 process photographed images of the imaging apparatus 1500 installed at an airport, a building entrance, or the like. In this example, the controller apparatus 1410 obtains the face area and distance information as the visible images and analysis parameters from the imaging apparatus 1500, thereby performing the 2D face authentication, whose image processing load is comparatively light, to the long-distance face area, or performing the 3D face authentication, whose image processing load is comparatively heavy, to the short-distance face area. Further, the controller apparatus 1510 acquires the face area and distance information as visible and infrared images and analysis parameters from the imaging apparatus 1500, thereby using the visible image with respect to the long-distance face area to perform the face authentication, or using the infrared image with respect to the short-distance face area to perform the iris authentication. Additionally, in order to solve congestion due to turn waiting, the controller apparatus 1510 can judge a person(s) present at a distance close to a predetermined position in the photographed image, and also perform the face authentication in that order.

Figure 16:
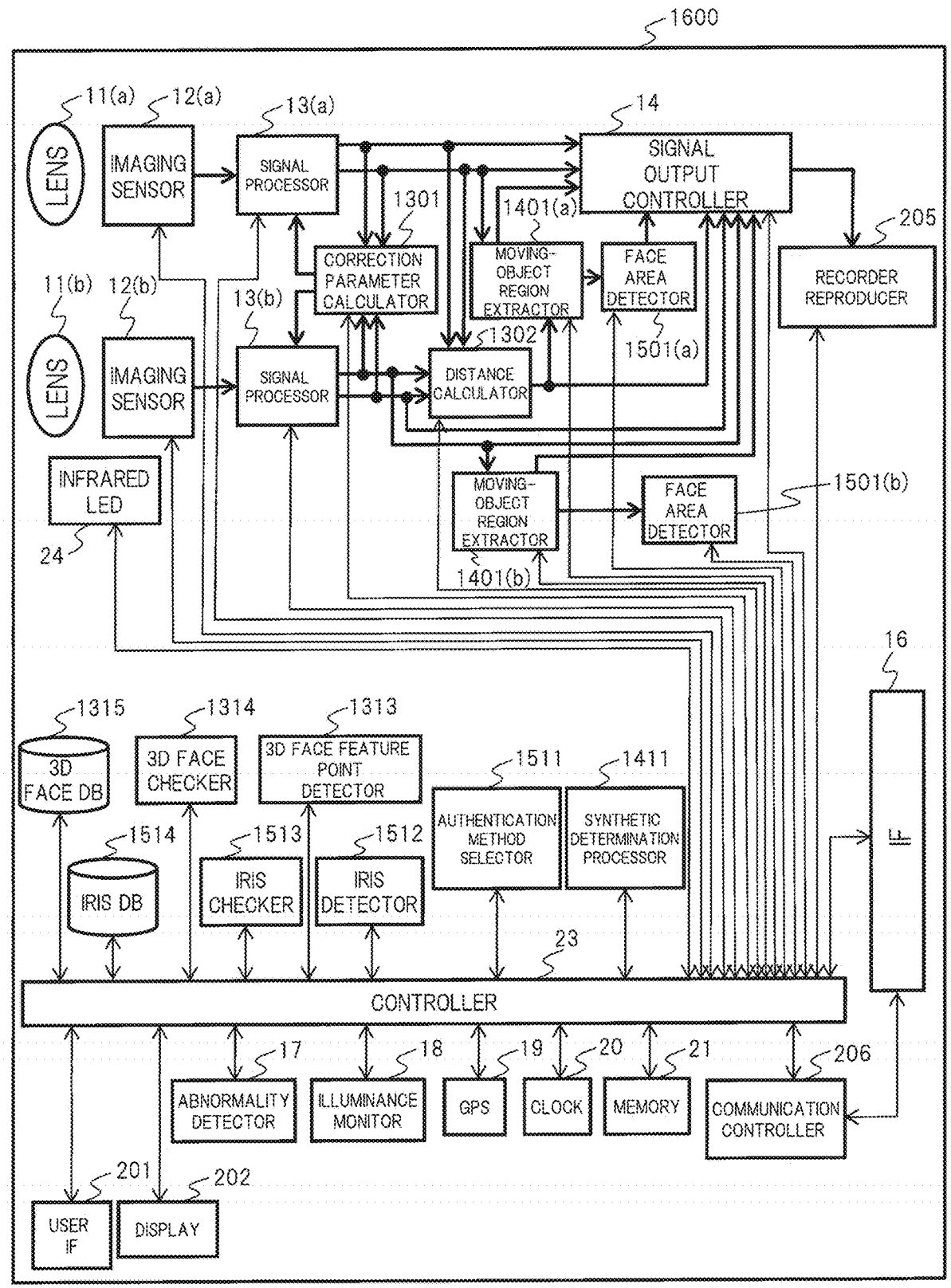
FIG. 16 is a schematic diagram showing yet another configuration example of the imaging system according to Embodiment 3 of the present invention.

FIG. 16 shows another configuration example of the imaging system according to the present embodiment. This imaging system shows, for example, an example mounted on a portable terminal such as a smartphone or tablet.

FIGS. 17 and 18 show configuration examples of function information and analysis parameters relating to the imaging apparatuses 1400 and 1500 used in this embodiment.

As shown in FIG. 17, a stereo image (distance image) generated by the imaging apparatus can be provided to the controller apparatus by a transfer method similar to that of the visible or infrared image.

Alternatively, as shown in FIG. 18, the above-mentioned stereo image can be also provided by a method that is added to the position information of the moving-object region and the position information of the face area. In this case, only distance information on coordinate areas corresponding to the moving-object region and face area is cut out and added.

Figure 20:
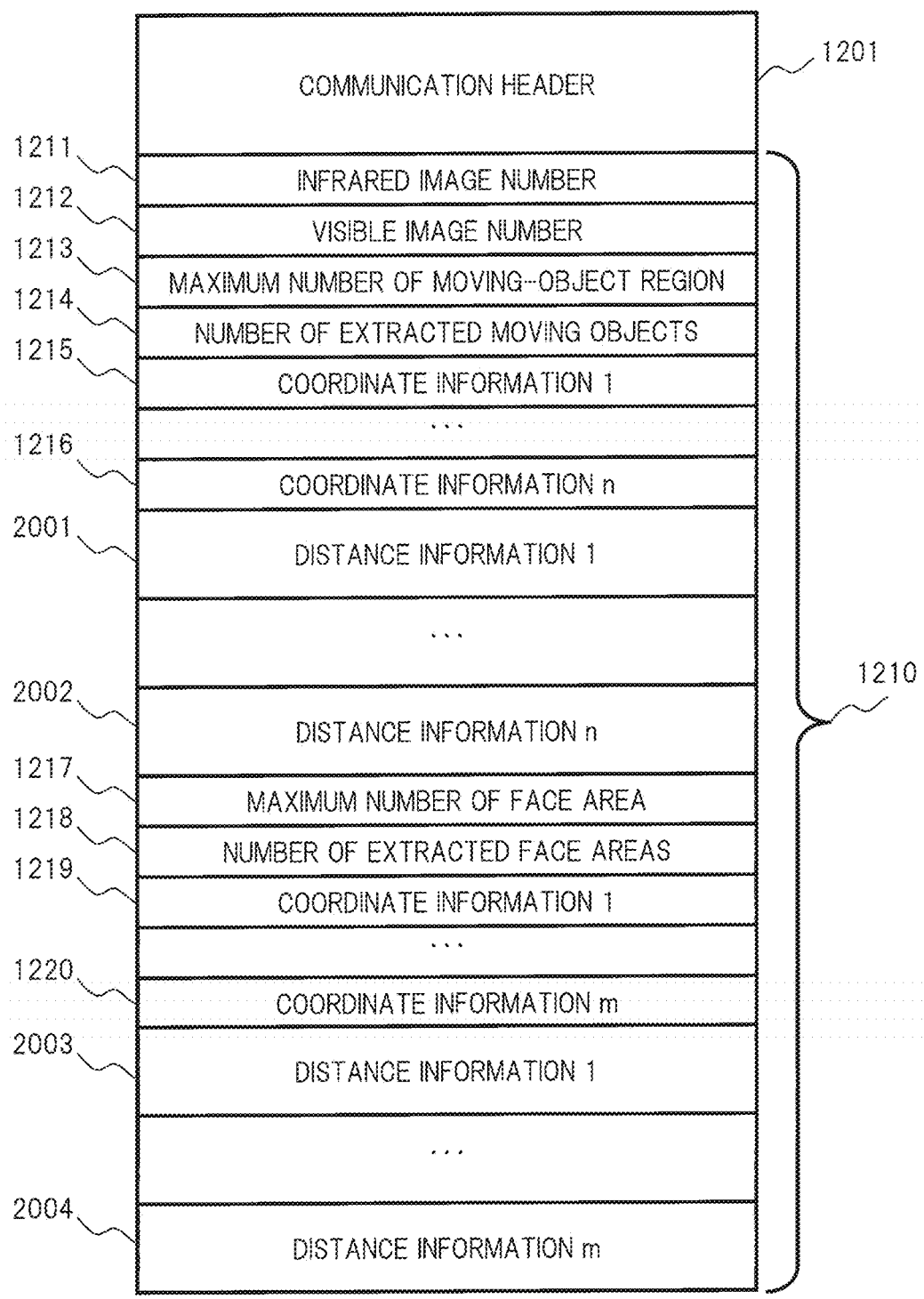
FIG. 20 is a diagram showing one configuration example of pieces of analysis metadata information handled by the imaging system according to Embodiment 3 of the present invention.

FIG. 20 shows a configuration example of sending distance information as apart of analysis parameters. For example, distance information is stored in a payload 1210; the distance information on the extracted moving-object region (n in number) is stored immediately after the coordinate information of the moving-object region (2001 and 2002); and the distance information on the face area (m in number) is stored immediately after the coordinate information of the face area (2003 and 2004). Besides the above configuration, such a configuration may be adopted that the coordinate information and the distance information are alternately stored.

Figure 19:
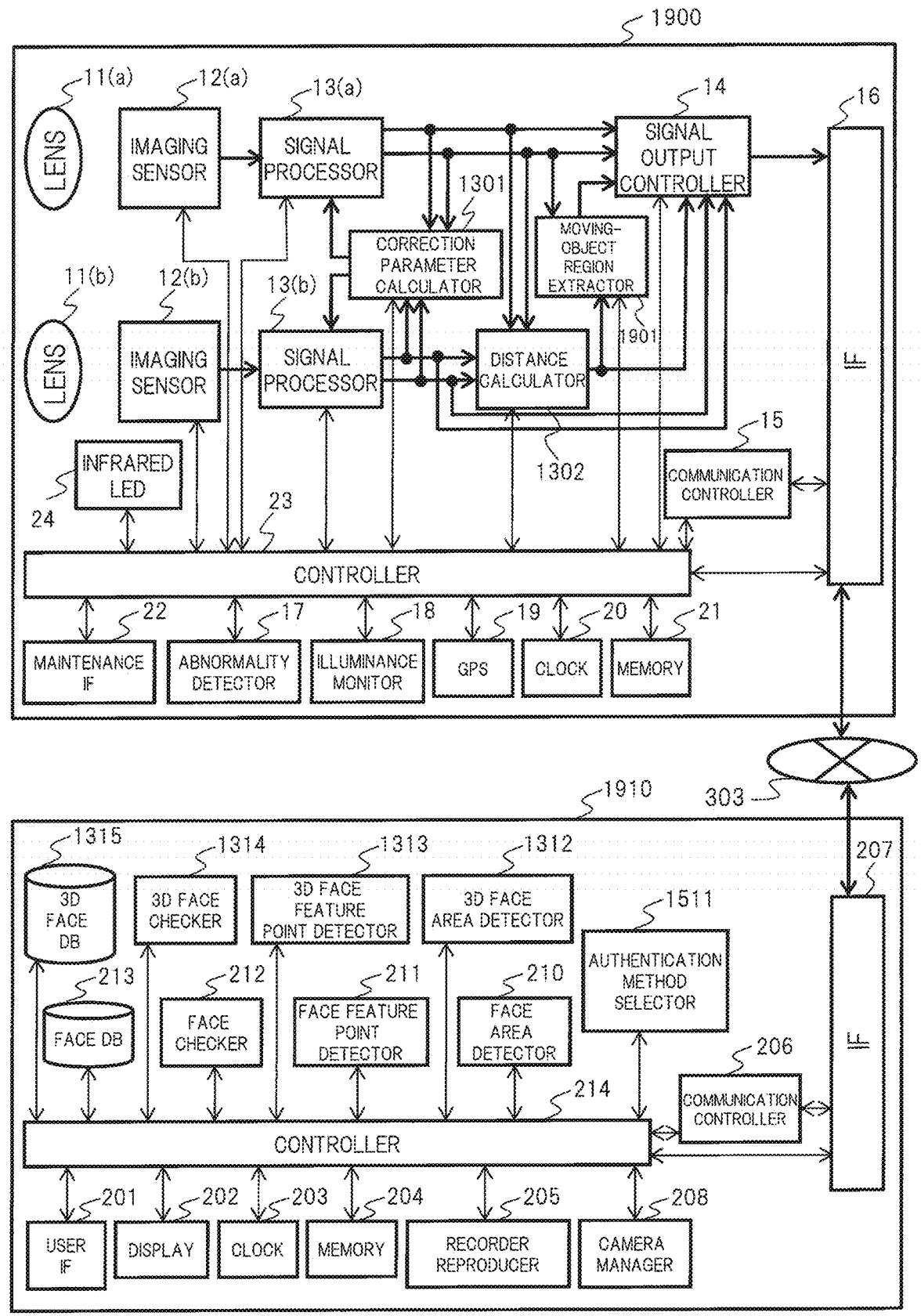
FIG. 19 is a diagram showing one configuration of pieces of analysis metadata information handled by the imaging system according to Embodiment 3 of the present invention.

FIG. 19 shows yet another configuration example of the imaging system of the present embodiment. An imaging apparatus 1900 of the imaging system has one moving-object region extractor 1901, and is configured to extract a moving-object region by using the infrared image of any one of the right and left signal processors 13(a) and 13(b). Alternatively, the imaging apparatus 1900 is configured to extract a moving-object region by using the infrared image of any one of the signal processors 13(a) and 13(b) and the stereo image outputted from the distance calculator 1302.

EXPLANATION OF NUMERALS

2 ... Sensor Body; 3 ... Color Filter; 5 ... DBPF (Optical Filter); 11 ... Lens (Optical System); 12 ... Imaging Sensor; 13 ... Signal Processor; 14 ... Signal Output Controller; 15 ... Communication Controller; 16 ... IF; 23 ... Controller; 100, 800, 810, 1300, 1400, 1500 ... Imaging Apparatus; 200, 1310, 1410, 1510 ... Controller Apparatus; 801, 1401 ... Moving-Objection Region Extractor; 802, 1501 ... Face Area Detector; 1301 ... Correction Parameter Calculator; 1302 ... Distance Calculator; and 1600 ... Portable Terminal.

The invention claimed is:

1. An imaging apparatus comprising:
two imaging elements each comprising multiple pixels arranged in an area for receiving light;
two single filters provided to the two imaging elements, respectively, each configured to have at least a characteristic of transmitting a visible light wavelength region, a characteristic of blocking a first light wavelength region, except for a second light wavelength region, of a longer wavelength side than the visible light wavelength region, and a characteristic of transmitting the second light wavelength region which is part of the first light wavelength region, each of the two single filters being configured to filter light incident on an entirety of the area of corresponding one of the two imaging elements based on the characteristics;
two signal processors each configured to process a signal obtained by photographing light that has passed through corresponding one of the two single filters with corresponding one of the two imaging elements and output a visible light signal and a signal corresponding to the second light wavelength region;
a distance calculator configured to use the two visible light signals or the two signals corresponding to the second light wavelength region outputted by the two signal processors to calculate a distance to a subject;
a moving-object region detector configured to detect a moving-object region in images captured by the two imaging elements, based on the two visible light signals or the two signals corresponding to the second light wavelength region outputted by the two signal processors; and
a signal output controller configured to output position information of the moving-object region in the images and distance information outside, the moving-object region being detected by the moving-object region detector, the distance information being calculated by the distance calculator.

2. The imaging apparatus according to claim 1, further comprising:
a correction parameter calculator configured to perform a correction processing to the two visible light signals and the two signals corresponding to the second light wavelength region outputted by the two signal processors to match signal levels of the two visible light signals and/or the two signals corresponding to the second light wavelength region.

3. The imaging apparatus according to claim 1, further comprising a color filter having a red filter, a green filter, a blue filter, and an infrared filter between the imaging element and the filter.

4. An imaging system comprising: one or more imaging apparatuses connected to a network; and a controller apparatus,
the imaging apparatus comprising:
two imaging elements each comprising multiple pixels arranged in an area for receiving light;
two single filters provided to the two imaging elements, respectively, each configured to have at least a characteristic of transmitting a visible light wavelength region, a characteristic of blocking a first light wavelength region, except for a second light wavelength region, of a longer wavelength side than the visible light wavelength region, and a characteristic of transmitting the second light wavelength region which is part of the first light wavelength region, each of the two single filters being configured to filter light incident on an entirety of the area of corresponding one of the two imaging elements based on the characteristics;
two signal processors each configured to process a signal obtained by photographing the light that has passed through corresponding one of the two single filters with corresponding one of the two imaging element and output a visible light signal and a signal corresponding to the second light wavelength region;
a distance calculator configured to use the two visible light signals or the two signals corresponding to the second light wavelength region outputted by the two signal processors to calculate a distance to a subject; and
a signal output controller configured to add second data to first data or multiply the first data by the second data to transmit the added or multiplied first and second data outside, the first data being based on the two visible light signals outputted from the signal processors, the second data being based on a distance image generated by the distance calculator, and
the controller apparatus comprising:
a face authentication unit configured to use the first and second data received from the imaging apparatus to perform face authentication that uses three-dimensional information.

5. The imaging system according to claim 4, further comprising:
the imaging apparatus comprising:
two moving-object region extractors each configured to generate, from the signals corresponding to the second light wavelength region outputted from the two signal processors, information on a moving object in an image photographed by the imaging element; and
the signal output controller configured to add third data to a first data or multiply the third data by the first data to transmit the added or multiplied first and third data outside, the first data being based on the visible light signals outputted from the signal processors, the third data being based on information on moving objects generated by the two moving-object region extractors; and
the controller apparatus comprising:
the face authentication unit configured to use the first, second, and third data received from the imaging apparatus to perform face authentication that uses three-dimensional information.

6. The imaging system according to claim 5, further comprising:
the imaging apparatus comprising:
two face area detectors configured to detect a person's face area from information on the moving objects outputted from the two moving-object region extractors; and
the signal output controller configured to add a fourth data to a first data or multiply the first data by the fourth data to transmit the added or multiplied first and fourth data outside, the first data being based on the visible light signals outputted from the signal processors, the fourth data being based on information on person's face areas generated by the face area detectors; and
the controller apparatus comprising:
the face authentication unit configured to use the first, second, and fourth data received from the imaging apparatus to perform face authentication that uses three-dimensional information.

* * * * *